US009822030B2

(12) United States Patent
Annamalai et al.

(10) Patent No.: US 9,822,030 B2
(45) Date of Patent: Nov. 21, 2017

(54) ULTRALOW EXPANSION TITANIA-SILICA GLASS

(71) Applicant: Corning Incorporated, Corning, NY (US)

(72) Inventors: Sezhian Annamalai, Painted Post, NY (US); Carlos Alberto Duran, Ottawa (CA); Kenneth Edward Hrdina, Horseheads, NY (US); William Rogers Rosch, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 15/003,115

(22) Filed: Jan. 21, 2016

(65) Prior Publication Data
US 2016/0236965 A1    Aug. 18, 2016

Related U.S. Application Data

(60) Provisional application No. 62/115,767, filed on Feb. 13, 2015.

(51) Int. Cl.
*C03C 3/06*    (2006.01)
*C03C 3/076*    (2006.01)
(Continued)

(52) U.S. Cl.
CPC ............ *C03C 3/076* (2013.01); *C03B 19/12* (2013.01); *C03B 19/1453* (2013.01); *C03B 25/00* (2013.01); *C03B 25/02* (2013.01); *C03C 3/06* (2013.01); *C03C 3/089* (2013.01); *C03C 3/112* (2013.01); *C03C 23/007* (2013.01);
(Continued)

(58) Field of Classification Search
CPC ............................. C03C 3/06; C03C 2201/42
See application file for complete search history.

(56) References Cited

U.S. PATENT DOCUMENTS 3,853,384 A * 12/1974 Pinnow .................... G02B 6/02
                                                    385/124
4,620,861 A * 11/1986 Berkey ............. C03B 37/01446
                                                    65/397
(Continued)

FOREIGN PATENT DOCUMENTS

JP         05202141      6/2013
WO         2014085529    6/2014

OTHER PUBLICATIONS

International Search Report of the International Searching Authority; PCT/US2016/017230; dated Jun. 13, 2016.

*Primary Examiner* — Noah Wiese
(74) *Attorney, Agent, or Firm* — Kevin L. Bray

(57) ABSTRACT

Annealing treatments for modified titania-silica glasses and the glasses produced by the annealing treatments. The annealing treatments include an isothermal hold that facilitates equalization of non-uniformities in fictive temperature caused by non-uniformities in modifier concentration in the glasses. The annealing treatments may also include heating the glass to a higher temperature following the isothermal hold and holding the glass at that temperature for several hours. Glasses produced by the annealing treatments exhibit high spatial uniformity of CTE, CTE slope, and fictive temperature, including in the presence of a spatially non-uniform concentration of modifier.

17 Claims, 7 Drawing Sheets

(51) Int. Cl.
  *C03C 3/089*   (2006.01)
  *C03C 23/00*   (2006.01)
  *C03B 25/00*   (2006.01)
  *C03C 3/112*   (2006.01)
  *C03B 19/12*   (2006.01)
  *C03B 19/14*   (2006.01)
  *C03B 25/02*   (2006.01)

(52) U.S. Cl.
  CPC ...... *C03B 2201/10* (2013.01); *C03B 2201/12* (2013.01); *C03B 2201/42* (2013.01); *C03C 2201/10* (2013.01); *C03C 2201/12* (2013.01); *C03C 2201/14* (2013.01); *C03C 2203/52* (2013.01)

(56) References Cited

U.S. PATENT DOCUMENTS

| | | | |
|---|---|---|---|
| 6,263,706 B1 * | 7/2001 | Deliso | C03B 37/01211 |
| | | | 65/397 |
| 8,105,734 B2 | 1/2012 | Maida | |
| 8,541,325 B2 | 9/2013 | Duran | |
| 2006/0179879 A1 | 8/2006 | Ellison | |
| 2007/0130995 A1 * | 6/2007 | Hawtof | C03B 19/1423 |
| | | | 65/377 |
| 2007/0134566 A1 | 6/2007 | Maida | |
| 2011/0048075 A1 | 3/2011 | Duran | |
| 2011/0207593 A1 | 8/2011 | Duran | |
| 2014/0066286 A1 * | 3/2014 | Annamalai | C03C 3/06 |
| | | | 501/54 |
| 2014/0155246 A1 * | 6/2014 | Annamalai | C03C 3/06 |
| | | | 501/54 |
| 2015/0080206 A1 | 3/2015 | Duran | |

\* cited by examiner

ULTRALOW EXPANSION TITANIA-SILICA GLASS

This application claims the benefit of priority under 35 U.S.C. §119 of U.S. Provisional Application Ser. No. 62/115,767 filed on Feb. 13, 2015 the content of which is relied upon and incorporated herein by reference in its entirety.

FIELD

This description pertains to doped titania-silica glasses having an ultralow coefficient of thermal expansion and small expansivity slope and methods for making such glasses. More particularly, this description pertains to glasses having spatially uniform values of coefficient of thermal expansion and expansivity slope, including when the dopant concentration is spatially non-uniform.

BACKGROUND

Mirrors used in the projection optical systems of extreme ultraviolet lithography (EUVL) scanners include a reflective coating on a substrate. Since the illumination sources used in EUVL are high power, mirror substrates must meet stringent thermal expansion requirements in order to maintain their intended surface shape (known as "figure") when subjected to the temperature changes associated with the high thermal loads of the illumination source during normal operation of the scanner. A temperature-stable figure is necessary to avoid thermally-induced distortions in the wavefront characteristics of EUV projection optics. For this reason, the preferred material for manufacturing state of the mirror substrates for EUV projection optics is Ultra Low Expansion glass (ULE® Glass), manufactured by Corning Incorporated. Glass sold by Corning Inc. under the product code 7973 is specifically tuned for EUVL applications and is characterized by high degrees of precision and accuracy in controlling properties to achieve glasses with properties that can be customized to diverse applications. A defining feature of ULE® glass is the existence of a temperature close to room temperature at which its coefficient of thermal expansion (CTE) is exactly equal to zero. This temperature is known as a crossover temperature, a zero crossover temperature, or a temperature of zero crossover, and is denoted Tzc. Another important feature of ULE® glass for EUVL is that the slope of the temperature-dependent CTE curve (CTE slope or expansivity slope) is extremely small within a temperature range close to room temperature that includes Tzc. The CTE slope of ULE® glass is in the vicinity of $1\times10^{-9}/K^2$ (or, equivalently, 1 ppb/$K^2$). EUVL mirror substrates having Tzc near the temperatures expected when the mirror substrate is exposed to an EUV illumination source experience minimal thermal expansion during operation of the EUVL scanner and a small CTE slope ensures that the minimal thermal expansion is preserved if fluctuations in EUVL processing conditions cause variations in the thermal environment of the mirror substrate.

There are two sources of distortion of figure as mirrors are heated up: (1) if the mirror is heated uniformly (i.e., the temperature is uniform throughout its volume), its shape will change if the CTE is not uniform, because each volume element within the mirror substrate will seek to expand according to its local CTE value; and (2) if the CTE of the substrate is perfectly uniform, the figure of the substrate will become distorted if the substrate is heated non-uniformly. While the first source of distortion can be minimized by providing a highly uniform substrate material, minimization of the second source of distortion requires the value of CTE to be as close to zero as possible throughout the temperature range in use. Near-zero CTE can be achieved by choosing a substrate material with Tzc within the expected operational temperature range and minimizing the slope of the expansivity (CTE vs. T) curve. Actual EUVL mirror substrates suffer distortions due to both sources: the substrate material is never perfectly uniform and the mirrors are heated non-uniformly in practical operation. In order to maximize performance during use of the mirrors, it is therefore important to simultaneously achieve a high degree of CTE uniformity, a highly accurate Tzc targeted to the anticipated operational temperature range, and a CTE slope that is as low as possible.

SUMMARY

The present description provides glasses and methods of annealing glasses. The glasses are modified titania-silica glasses and the annealing methods condition the glasses to improve spatial uniformity of the coefficient of thermal expansion (CTE) and fictive temperature ($T_f$). The glasses also feature low expansivity slopes (CTE slopes) and are excellent substrate materials for EUV projection optics.

The glasses are modified titania-silica ($TiO_2$-$SiO_2$) glasses. The glasses have a $TiO_2$ concentration of at least 6 wt %, an $SiO_2$ concentration of at least 80 wt %, and a modifier concentration of at least 0.1 wt %. In one embodiment, the glasses have a $TiO_2$ concentration of at least 7 wt %, an $SiO_2$ concentration of at least 80 wt %, and a modifier concentration of at least 0.1 wt %. In one embodiment, the glasses contain 7.0 wt %-13.0 wt % $TiO_2$, 79.0 wt %-92.9 wt % $SiO_2$, and 0.1 wt %-8.0 wt % modifier. In another embodiment, the glasses contain 7.5 wt %-12.5 wt % $TiO_2$, 79.5 wt %-92.4 wt % $SiO_2$, and 0.1 wt %-8.0 wt % modifier. In one embodiment, the glasses contain 8.0 wt %-12.0 wt % $TiO_2$, 80.0 wt %-91.9 wt % $SiO_2$, and 0.1 wt %-8.0 wt % modifier.

Modifiers include non-oxide and oxide modifiers. Modifiers may be elemental or compounds. Non-oxide modifiers include OH, F and Cl. Oxide modifiers include $B_2O_3$.

The modified titania-silica glasses feature low CTE slopes and high spatial uniformity in CTE. In one embodiment, a piece of the glass having a volume of at least 5000 $cm^3$ has an average CTE slope less than 1.2 ppb/$K^2$ at 20° C. and a peak-to-valley variation in CTE of less than 5 ppb/K at 20° C. In another embodiment, a piece of the glass having a volume of at least 1000 $cm^3$ has an average CTE slope less than 1.2 ppb/$K^2$ at 20° C. and a peak-to-valley variation in CTE of less than 3 ppb/K at 20° C. In one embodiment, a piece of the glass having a volume of at least 500 $cm^3$ has an average CTE slope less than 1.2 ppb/$K^2$ at 20° C. and a peak-to-valley variation in CTE of less than 2 ppb/K at 20° C. In one embodiment, a piece of the glass having a volume of at least 100 $cm^3$ has an average CTE slope less than 1.2 ppb/$K^2$ at 20° C. and a peak-to-valley variation in CTE of less than 1 ppb/K at 20° C. In a further embodiment, a piece of the glass having a volume of at least 50 $cm^3$ has an average CTE slope less than 1.2 ppb/$K^2$ at 20° C. and a peak-to-valley variation in CTE of less than 0.5 ppb/K at 20° C.

In one embodiment, a piece of the glass having a volume of at least 5000 $cm^3$ has an average CTE slope less than 1.0 ppb/$K^2$ at 20° C. and a peak-to-valley variation in CTE of less than 5 ppb/K at 20° C. In another embodiment, a piece of the glass having a volume of at least 1000 $cm^3$ has an average CTE slope less than 1.0 ppb/K$^2$ at 20° C. and a peak-to-valley variation in CTE of less than 3 ppb/K at 20° C. In one embodiment, a piece of the glass having a volume of at least 500 cm$^3$ has an average CTE slope less than 1.0 ppb/K$^2$ at 20° C. and a peak-to-valley variation in CTE of less than 2 ppb/K at 20° C. In one embodiment, a piece of the glass having a volume of at least 100 cm$^3$ has an average CTE slope less than 1.0 ppb/K$^2$ at 20° C. and a peak-to-valley variation in CTE of less than 1 ppb/K at 20° C. In a further embodiment, a piece of the glass having a volume of at least 50 cm$^3$ has an average CTE slope less than 1.0 ppb/K$^2$ at 20° C. and a peak-to-valley variation in CTE of less than 0.5 ppb/K at 20° C.

The modified titania-silica glasses feature low CTE slopes and high spatial uniformity in CTE. In one embodiment, a piece of the glass having a volume of at least 5000 cm$^3$ has an average CTE slope less than 0.8 ppb/K$^2$ at 20° C. and a peak-to-valley variation in CTE of less than 5 ppb/K at 20° C. In another embodiment, a piece of the glass having a volume of at least 1000 cm$^3$ has an average CTE slope less than 0.8 ppb/K$^2$ at 20° C. and a peak-to-valley variation in CTE of less than 3 ppb/K at 20° C. In one embodiment, a piece of the glass having a volume of at least 500 cm$^3$ has an average CTE slope less than 0.8 ppb/K$^2$ at 20° C. and a peak-to-valley variation in CTE of less than 2 ppb/K at 20° C. In one embodiment, a piece of the glass having a volume of at least 100 cm$^3$ has an average CTE slope less than 0.8 ppb/K$^2$ at 20° C. and a peak-to-valley variation in CTE of less than 1 ppb/K at 20° C. In a further embodiment, a piece of the glass having a volume of at least 50 cm$^3$ has an average CTE slope less than 0.8 ppb/K$^2$ at 20° C. and a peak-to-valley variation in CTE of less than 0.5 ppb/K at 20° C.

The modified titania-silica glasses feature low CTE slopes and high spatial uniformity in CTE when the concentration of the modifier is spatially non-uniform. In one embodiment, the glass has an average CTE slope less than 1.2 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.01 wt %. In another embodiment, the glass has an average CTE slope less than 1.2 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.02 wt %. In still another embodiment, the glass has an average CTE slope less than 1.2 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.03 wt %. In a further embodiment, the glass has an average CTE slope less than 1.2 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.05 wt %.

The modified titania-silica glasses feature low CTE slopes and high spatial uniformity in CTE when the concentration of the modifier is spatially non-uniform. In one embodiment, the glass has an average CTE slope less than 1.0 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.01 wt %. In another embodiment, the glass has an average CTE slope less than 1.0 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.02 wt %. In still another embodiment, the glass has an average CTE slope less than 1.0 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.03 wt %. In a further embodiment, the glass has an average CTE slope less than 1.0 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.05 wt %.

The modified titania-silica glasses feature low CTE slopes and high spatial uniformity in CTE when the concentration of the modifier is spatially non-uniform. In one embodiment, the glass has an average CTE slope less than 0.8 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.01 wt %. In another embodiment, the glass has an average CTE slope less than 0.8 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.02 wt %. In still another embodiment, the glass has an average CTE slope less than 0.8 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.03 wt %. In a further embodiment, the glass has an average CTE slope less than 0.8 ppb/K$^2$ at 20° C., a peak-to-valley variation in CTE of less than 5 ppb/K at 20° C., an average modifier concentration of at least 0.1 wt %, and a peak-to-valley variation in modifier concentration of at least 0.05 wt %.

Preparation of the modified titania-silica glasses includes treatment by annealing. In one embodiment, the annealing treatment includes cooling the glass from a temperature above 900° C. at a cooling rate less than 5° C./hr to a temperature in the range from 750° C. to 850° C. and holding the glass at constant temperature at a temperature in the range from 750° C. to 850° C. for a time period of at least 10 hours. In another embodiment, the annealing treatment includes cooling the glass from a temperature above 900° C. at a cooling rate less than 5° C./hr to a temperature in the range from 750° C. to 850° C. and holding the glass at constant temperature at a temperature in the range from 750° C. to 850° C. for a time period of at least 50 hours. In still another embodiment, the annealing treatment includes cooling the glass from a temperature above 900° C. at a cooling rate less than 5° C./hr to a temperature in the range from 750° C. to 850° C. and holding the glass at constant temperature at a temperature in the range from 750° C. to 850° C. for a time period of at least 100 hours. In a further embodiment, the annealing treatment includes cooling the glass from a temperature above 900° C. at a cooling rate less than 5° C./hr to a temperature in the range from 750° C. to 850° C. and holding the glass at constant temperature at a temperature in the range from 750° C. to 850° C. for a time period of at least 200 hours. Following the hold at constant temperature, the glass may be cooled to room temperature at an arbitrary rate. The arbitrary rate may be a cooling rate greater than 1° C./hr, or a cooling rate greater than 5° C./hr, or a cooling rate greater than 10° C./hr, or the natural cooling rate of the furnace in which annealing occurs when the furnace is turned off.

In other embodiments, the annealing treatment may include a heating step following the hold at constant temperature. In one embodiment, the glass is heated to a temperature at least 1° C. higher than the constant holding temperature and then cooled to room temperature. In another embodiment, the glass is heated to a temperature at least 2° C. higher than the constant holding temperature and then cooled to room temperature. In still another embodiment, the glass is heated to a temperature at least 3° C. higher than the constant holding temperature and then cooled to room temperature. In a further embodiment, the glass is heated to a temperature at least 5° C. higher than the constant holding temperature and then cooled to room temperature. In other embodiments, the glass may be held at the higher temperature for at least 10 hours, or at least 20 hours, or at least 50 hours before cooling to a lower temperature.

In one embodiment, the glass is a modified titania-silica glass having an average modifier concentration of at least 0.1 wt % that includes a high concentration region with a modifier concentration at least 0.01 wt % greater than the average modifier concentration and a low concentration region having a modifier concentration at least 0.01 wt % less than the average modifier concentration, where the coefficient of thermal expansion of the first region and the coefficient of thermal expansion of the second region differ by less than 5 ppb/K, or less than 2 ppb/K, or less than 1 ppb/K, or less than 0.5 ppb/K. The average modifier concentration may be at least 0.2 wt %, or at least 0.3 wt %, or at least 0.5 wt %, or at least 1.0 wt %, or at least 2.0 wt %, or at least 3.0 wt %.

In one embodiment, the glass has a peak-to-valley variation in fictive temperature less than 3° C., a modifier concentration of at least 0.1 wt %, and a peak-to-valley modifier concentration of at least 0.01 wt %. In another embodiment, the glass has a peak-to-valley variation in fictive temperature less than 3° C., a modifier concentration of at least 0.1 wt %, and a peak-to-valley modifier concentration of at least 0.03 wt %. In still another embodiment, the glass has a peak-to-valley variation in fictive temperature less than 3° C., a modifier concentration of at least 0.1 wt %, and a peak-to-valley modifier concentration of at least 0.05 wt %.

In one embodiment, the glass is a modified titania-silica glass with an average modifier concentration of at least 0.1 wt % that includes a high concentration region with a modifier concentration at least 0.01 wt % greater than the average modifier concentration and a low concentration region having a modifier concentration at least 0.01 wt % less than the average modifier concentration, where the fictive temperature of the high concentration region differs from the fictive temperature of the low concentration region by less than 3° C., or less than 2° C., or less than 1° C., or less than 0.5° C. The average modifier concentration may be at least 0.2 wt %, or at least 0.3 wt %, or at least 0.5 wt %, or at least 1.0 wt %, or at least 2.0 wt %, or at least 3.0 wt %.

The present description extends to:
A method of annealing glass comprising:
  providing a modified titania-silica glass, said modified titania-silica glass including a non-uniform concentration of a modifier;
  heating said modified titania-silica glass to a first temperature, said first temperature exceeding 850° C.;
  cooling said modified titania-silica glass at a first cooling rate from said first temperature to a second temperature, said second temperature being in the range from 650° C. to 800° C.; and
  holding said modified titania-silica glass at said second temperature for a first time period, said first time period lasting for at least 10 hours.

The present description extends to:
A method of annealing glass comprising:
  providing a modified titania-silica glass, said modified titania-silica glass including a non-uniform concentration of a modifier;
  heating said modified titania-silica glass to a first temperature, said first temperature exceeding 900° C.;
  cooling said modified titania-silica glass at a first cooling rate from said first temperature to a second temperature, said second temperature being in the range from 750° C. to 850° C.; and
  holding said modified titania-silica glass at said second temperature for a first time period, said first time period lasting for at least 10 hours.

The present description extends to:
A method of annealing glass comprising:
  providing a modified titania-silica glass, said modified titania-silica glass including a non-uniform concentration of a modifier;
  heating said modified titania-silica glass to a first temperature, said first temperature exceeding 850° C.;
  cooling said modified titania-silica glass at a first cooling rate from said first temperature to a second temperature, said second temperature being in the range from 650° C. to 800° C.;
  cooling said modified titania-silica glass at a second cooling rate from said second temperature to a third temperature, said second cooling rate being less than 1° C./hr, said cooling at said second cooling rate occurring for at least 10 hours.

The present description extends to:
A method of annealing glass comprising:
  providing a modified titania-silica glass, said modified titania-silica glass including a non-uniform concentration of a modifier;
  heating said modified titania-silica glass to a first temperature, said first temperature exceeding 900° C.;
  cooling said modified titania-silica glass at a first cooling rate from said first temperature to a second temperature, said second temperature being in the range from 750° C. to 850° C.;
  cooling said modified titania-silica glass at a second cooling rate from said second temperature to a third temperature, said second cooling rate being less than 1° C./hr, said cooling at said second cooling rate occurring for at least 10 hours.

The present description extends to:
An article comprising a glass, said glass having a composition comprising:
  7.0 wt %-13.0 wt % $TO_2$;
  79.0 wt %-92.9 wt % $SiO_2$; and
  0.1 wt %-8.0 wt % modifier;
  wherein said glass has an average CTE slope at 20° C. less than 1.0 ppb/$K^2$; and
  wherein said glass has a non-uniform coefficient of thermal expansion at 20° C., said non-uniform coefficient of thermal expansion including a maximum coefficient of thermal expansion and a minimum coefficient of thermal expansion, the difference between said maximum coefficient of thermal expansion and said minimum coefficient of thermal expansion not exceeding 5 ppb/K; and
  wherein said glass has a non-uniform modifier concentration, said non-uniform modifier concentration including a maximum modifier concentration and a minimum modifier concentration, the difference between said maximum modifier concentration and said minimum modifier concentration exceeding 0.03 wt %.

The present description extends to:

An article comprising a glass, said glass having a volume of at least 100 cm³ and a composition comprising:
- 7.0 wt %-13.0 wt % $TiO_2$;
- 79.0 wt %-92.9 wt % $SiO_2$; and
- 0.1 wt %-8.0 wt % modifier;
- wherein said glass has an average CTE slope at 20° C. less than 1.2 ppb/K²; and
- wherein said glass has a has a non-uniform coefficient of thermal expansion at 20° C., said non-uniform coefficient of thermal expansion including a maximum coefficient of thermal expansion in said volume and a minimum coefficient of thermal expansion in said volume, the difference between said maximum coefficient of thermal expansion and said minimum coefficient of thermal expansion not exceeding 5 ppb/K; and
- wherein said glass has a non-uniform modifier concentration, said non-uniform modifier concentration including a maximum modifier concentration in said volume and a minimum modifier concentration in said volume, the difference between said maximum modifier concentration and said minimum modifier concentration exceeding 0.03 wt %.

The present description extends to:

An article comprising a glass, said glass having a composition comprising:
- 7.0 wt %-13.0 wt % TiO2;
- 79.0 wt %-92.9 wt % SiO2; and
- 0.1 wt %-8.0 wt % modifier;
- wherein said glass has an average CTE slope at 20° C. less than 1.0 ppb/K²; and
- wherein said glass has a non-uniform coefficient of thermal expansion at 20° C., said non-uniform coefficient of thermal expansion including a maximum coefficient of thermal expansion and a minimum coefficient of thermal expansion, the difference between said maximum coefficient of thermal expansion and said minimum coefficient of thermal expansion not exceeding 5 ppb/K; and
- wherein said glass has a non-uniform modifier concentration, said non-uniform modifier concentration including a maximum modifier concentration and a minimum modifier concentration, the difference between said maximum modifier concentration and said minimum modifier concentration exceeding 0.03 wt %.

The present description extends to:

An article comprising a glass, said glass having a composition comprising:
- 7.0 wt %-13.0 wt % TiO2;
- 79.0 wt %-92.9 wt % SiO2; and
- 0.1 wt %-8.0 wt % modifier;
- wherein said glass has an average CTE slope at 20° C. less than 1.2 ppb/K²; and
- wherein said glass has a non-uniform coefficient of thermal expansion at 20° C., said non-uniform coefficient of thermal expansion including a maximum coefficient of thermal expansion and a minimum coefficient of thermal expansion, the difference between said maximum coefficient of thermal expansion and said minimum coefficient of thermal expansion not exceeding 5 ppb/K; and
- wherein said glass has a non-uniform modifier concentration, said non-uniform modifier concentration including a maximum modifier concentration and a minimum modifier concentration, the difference between said maximum modifier concentration and said minimum modifier concentration exceeding 0.03 wt %.

The present description extends to:

An article comprising a glass, said glass having a composition comprising:
- 7.0 wt %-13.0 wt % $TiO_2$;
- at least 79.0 wt % $SiO_2$; and
- a modifier, said modifier having an average concentration of at least 0.1 wt %, said glass having an average CTE slope at 20° C. less than 1.0 ppb/K²; said glass including a first region and a second region, said first region having a first coefficient of thermal expansion and a concentration of said modifier at least 0.03 wt % greater than said average modifier concentration, said second region having a second coefficient of thermal expansion and a concentration of said modifier at least 0.03 wt % less than said average modifier concentration, said second coefficient of thermal expansion differing from said first coefficient of thermal expansion by less than 5 ppb/K.

The present description extends to:

An article comprising a glass, said glass having a composition comprising:
- 7.0 wt %-13.0 wt % $TiO_2$;
- at least 79.0 wt % $SiO_2$; and
- a modifier, said modifier having an average concentration of at least 0.1 wt %, said glass having an average CTE slope at 20° C. less than 1.2 ppb/K²; said glass including a first region and a second region, said first region having a first coefficient of thermal expansion and a concentration of said modifier at least 0.03 wt % greater than said average modifier concentration, said second region having a second coefficient of thermal expansion and a concentration of said modifier at least 0.03 wt % less than said average modifier concentration, said second coefficient of thermal expansion differing from said first coefficient of thermal expansion by less than 5 ppb/K.

The present description extends to:

An article comprising a glass, said glass having a composition comprising:
- 7.0 wt %-13.0 wt % $TiO_2$;
- at least 79.0 wt % $SiO_2$; and
- a modifier, said modifier having an average concentration of at least 0.1 wt %, said glass having an average CTE slope at 20° C. less than 1.0 ppb/K²; said glass including a first region and a second region, said first region having a first fictive temperature and a concentration of said modifier at least 0.03 wt % greater than said average modifier concentration, said second region having a second fictive temperature and a modifier concentration at least 0.03 wt % less than said average modifier concentration, said first fictive temperature exceeding said second fictive temperature.

The present description extends to:

An article comprising a glass, said glass having a composition comprising:
- 7.0 wt %-13.0 wt % $TiO_2$;
- at least 79.0 wt % $SiO_2$; and
- a modifier, said modifier having an average concentration of at least 0.1 wt %, said glass having an average CTE slope at 20° C. less than 1.2 ppb/K²; said glass including a first region and a second region, said first region having a first fictive temperature and a concentration of said modifier at least 0.03 wt % greater than said average modifier concentration, said second region having a second fictive temperature and a modifier concentration at least 0.03 wt % less than said average modifier concentration, said first fictive temperature exceeding said second fictive temperature.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the description, it is believed that the description will be better understood from the following specification when taken in conjunction with the accompanying drawings, wherein:

DETAILED DESCRIPTION

Figure 1:
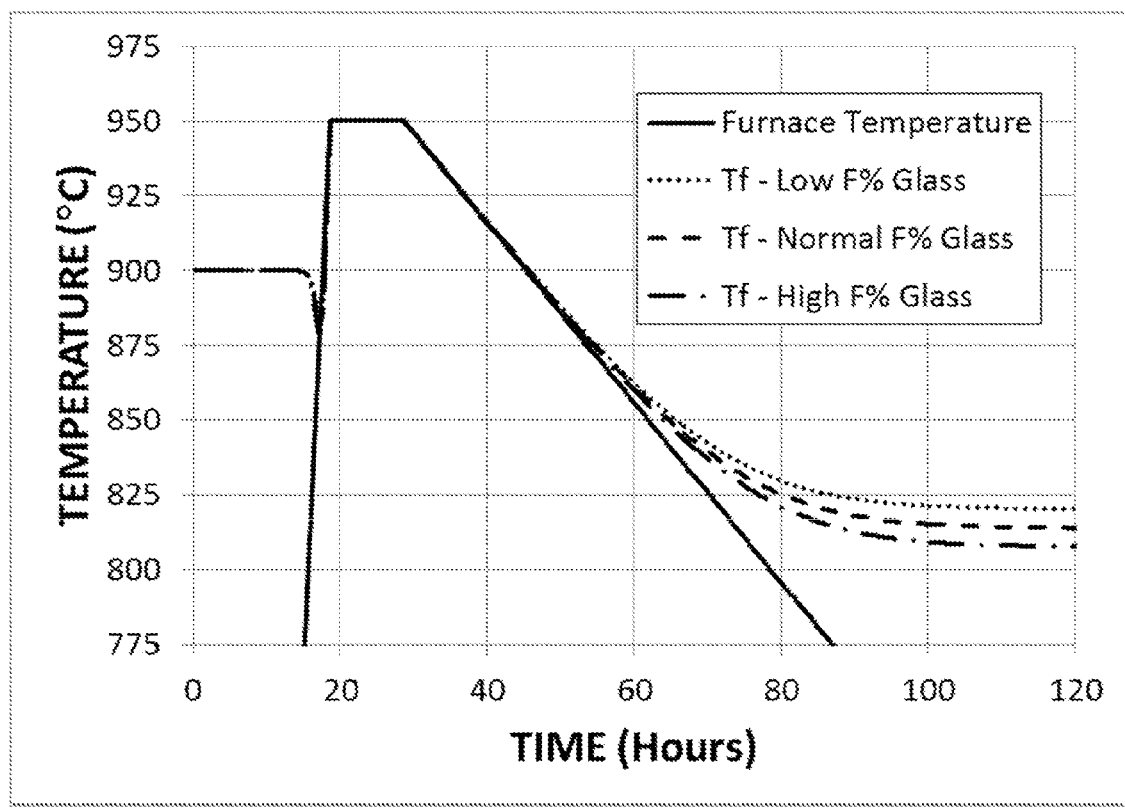
FIG. 1 shows the time variation of the fictive temperature of an F-modified titania-silica glass under annealing conditions that include cooling from 950° C. at a rate of 3° C./hr.

The present description provides glasses and methods of annealing glasses. The glasses are modified titania-silica glasses and the annealing treatments condition the glasses to improve spatial uniformity of the coefficient of thermal expansion (CTE) and fictive temperature ($T_f$). The glasses also feature low expansivity slopes (CTE slopes) and are excellent substrate materials for EUV projection optics. CTE may also be referred to herein as expansivity and CTE slope may also be referred to herein as expansivity slope. CTE slope refers to the slope of the CTE vs. Temperature relationship of the present modified titania-silica glass. Unless otherwise specified, CTE refers to CTE at 20° C. and CTE slope refers to CTE slope at 20° C.

The following description refers to various annealing treatments that include steps of heating and cooling from, to, or between specified temperatures at specified heating or cooling rates and/or for specified times. Unless otherwise specified, temperatures and rates of heating or cooling refer to conditions of operation of the furnace in which the annealing treatment occurs. Reference to heating (or cooling) and heating a glass (or cooling a glass) to a particular temperature means that the conditions of the furnace are set to provide the particular temperature. Similarly, reference to a particular heating rate (or rate of heating) or a particular cooling rate (or rate of cooling) means that the conditions of the furnace are set to provide the particular heating rate or particular cooling rate. It is understood and recognized by those of skill in the art, however, that there may be a lag time between setting the temperature or rate of heating or cooling of the furnace and the time at which the conditions of the glass match the furnace settings. As a result, the actual conditions at the glass may deviate from furnace conditions.

The semiconductor industry produces the silicon chips that have fuelled the information revolution that has occurred over the past few decades. The success of the semiconductor industry can be attributed to continuous improvements in the performance of semiconductor chips and continued reductions in manufacturing costs. Performance improvements and cost reductions have been achieved primarily through miniaturization of chips and devices and miniaturization has been made possible through increases in the optical resolution of lithography scanners. Since lithographic feature size correlates with the wavelength of the optical source, there has been a strong demand to decrease the operating wavelength of scanners in lithographic systems. The practical resolution limit achievable using traditional, refractive optics has been reached at the current lithographic wavelength of ~193 nm (ArF excimer lasers). Current ArF scanners are now reaching their minimum practical feature size.

In order to decrease feature size and increase device density beyond the limits of ArF scanners, the industry needs to develop a new technology. The most promising emerging technology is extreme ultraviolet lithography (EUVL). Several pilot-line EUVL tools are currently in operation and chip production using EUVL is expected to begin soon in the near future. A key difference between current, pilot-line and production-scale EUVL tools is the much higher light source intensity required for production scale to fulfil throughput requirements. Future-generation EUVL tools are likely to intensify the trend toward high intensity, high energy EUV light sources to maximize manufacturing productivity and resolution.

EUVL is similar to current optical lithography in that it relies on an optical projection system to reproduce features from a master reticle (a mask) onto a thin photosensitive layer (resist) deposited on the surface of a semiconductor wafer. EUVL operates at a wavelength of ~13.4 nm, a wavelength at which no known material is transparent. Thus, EUVL projection systems utilize reflective components (mirrors) rather than refractive elements (lenses). The extremely short wavelength of the EUV radiation poses a number of challenges to the design of EUVL systems. Reflective coatings on the mirrors, for example, are fundamentally limited to ~70% efficiency, which means that ~30% of EUV source radiation is lost at each reflective surface in the scanner. The lost radiation is absorbed as heat by the mirror substrate. Heat absorption by the mirror substrate is undesirable because it may cause thermal expansions or contractions of the substrate, which may deform or alter the reflective coating and lead to distortions in the wavefront of the reflected EUV radiation. Wavefront distortions, in turn, may lead to deterioration in the resolution of the EUVL system. Additionally, since gases absorb 13.4 nm radiation, EUVL systems must operate under an internal vacuum. Vacuum conditions make it more difficult to remove heat from the mirrors and exacerbate the problem of mirror heating.

As the EUVL technology matures and more powerful illumination sources are implemented, it will become increasingly challenging to identify mirror substrates capable of maintaining figure when subjected to the high anticipated thermal loads. Depending on the mode of use of the EUVL system, mirror deformation can be ascribed to two main mechanisms: (a) uniform heating of a substrate having a non-spatially uniform CTE, and (b) non-uniform heating of a substrate having a spatially uniform CTE. In order to preserve substrate figure during system operation, future mirror substrates will need to meet tighter constraints on spatial uniformity of CTE for minimizing figure deformation by mechanism (a) and on CTE slope for minimizing figure deformation by mechanism (b).

Silica-titania glass, such as ULE® glass, is presently the material of choice for mirror substrates in EUVL projection systems. ULE® glass has an extremely low coefficient of thermal expansion (CTE) at room temperature, which is critical in allowing the shape of the mirror to remain substantially constant upon heating. ULE® glass also features low striae (which enables the production of very precise mirror surfaces), long term chemical and dimensional stability, and compatibility with a vacuum environment.

Standard ULE® glass is a titania-silica glass that contains ~92.6 wt. % $SiO_2$, ~7.4 wt. % $TiO_2$ and ~0.1% OH content. The CTE slope of ULE® glass is determined primarily by the fictive temperature (Tf) of the glass and Tf is controlled by the annealing treatment employed in the manufacture of the glass. The standard annealing process for ULE® glass involves heating the glass up to a maximum temperature, holding it for several hours to induce relaxation of stresses, and slowly cooling the glass at a uniform cooling rate to a predetermined lower temperature. The glass is then cooled at a faster rate from the lower temperature to room temperature. If the maximum and lower temperatures are properly chosen, the cooling rate between the two temperatures establishes Tf of the glass. Through annealing, Tf of the glass can be controlled to provide a glass with a CTE slope that is suitable for the intended application. Establishing a particular Tf through a controlled uniform cooling is advantageous in the context of regular production because for a material such as ULE® glass, Tf is uniform and reproducible from run to run, even if the temperature uniformity of the furnace is not precise and/or the values of maximum and lower temperatures used in the annealing treatment drift over time due to aging of the furnace components.

The standard annealing treatment normally applied to standard ULE® glass provides a glass having Tf between 850° C. and 900° C., and CTE slope at 20° C. between 1.3 and 1.6 $ppb/K^2$. Lower values of Tf and CTE slope are possible by slowing the rate of cooling from the maximum temperature to the lower temperature of the annealing schedule. Although the detailed behavior of the glass as a function of annealing is complicated, the general trend is that as Tf of ULE® glass is lowered through slower and longer annealing treatments, absolute CTE increases and CTE slope decreases. In approximate terms, a reduction in Tf by ~10° C. leads to an increase in absolute CTE of ~6 ppb/K and a decrease in CTE slope of ~0.06 $ppb/K^2$. While annealing ULE® glass using a treatment schedule with a duration of a few days can produce a glass with Tf~900° C. and a CTE slope of 1.6 $ppb/K^2$, an annealing treatment schedule lasting several weeks is required to achieve a glass with Tf~850° C. and CTE slope 1.3 $ppb/K^2$. Further reduction in the CTE slope of ULE® glass is possible, but only at the cost of exponentially longer and increasingly impractical annealing treatment times. The practical limit for ULE® glass with the typical 0.1% OH content is estimated to be around 1.2 $ppb/K^2$.

Strategies for reducing the time of annealing required to produce glasses having a low Tf and low CTE slope have focused on modifications of glass composition. The objective is to incorporate a modifying element or compound into the glass composition so that lower values of Tf and CTE slope can be obtained in shorter annealing times.

Inclusion of modifiers in the composition, however, raises concerns over the degree of compositional homogeneity needed to achieve spatial uniformity of properties. It is known, for example, that the main cause of spatial non-uniformity of CTE in ULE® glass is spatial non-uniformity in the concentration of $TiO_2$. Titania-silica glasses typically include regions that differ, on a local scale, in titania concentration. Non-uniformity in CTE arises because regions with relatively high titania concentration differ in CTE from regions with relatively low titania concentration. When heated, the figure of glass distorts because of differences in the thermal expansion of regions with high and low titania concentration.

Efforts in the prior art to minimize thermally-induced distortions in the figure of modified glasses have focused on techniques that seek to improve the compositional homogeneity of the modifiers in the glass. The prevailing rationale of the prior art has been that minimization of CTE non-uniformities in modified silica glasses requires high uniformity in the concentration of modifiers.

The present description deviates from the prior art by demonstrating that modified titania-silica glasses with spatial uniformity of properties can be achieved for certain modifiers even if spatial variation in the concentration of the modifier is present in the glass. The present description recognizes that the effect of a particular modifier on the properties of a glass includes an intrinsic contribution and an extrinsic contribution. The intrinsic contribution is determined by the chemical identity of the modifier. Modifiers that differ in chemical identity intrinsically influence the properties of glasses in different ways. The extrinsic contribution is determined by the influence of the modifier on the structural relaxation of the glass.

While not wishing to be bound by theory, it is believed that the relative importance of the intrinsic and extrinsic contributions of a particular glass modifier to glass properties differs for different modifiers. It is further believed that uniformity of the properties of a modified glass requires high spatial uniformity in the concentration of the modifier when the effect of the modifier on glass properties is dominated by its intrinsic contribution. Conversely, it is believed that spatial uniformity of modifier concentration is less important to achieving uniformity of glass properties when the effect of the modifier on glass properties is dominated by its extrinsic contribution. The present description further demonstrates that annealing treatments are much more effective at homogenizing the properties of modified glasses when the effect of the modifier on glass properties is dominated by its extrinsic contribution.

A modifier whose effect on glass properties is dominated by its intrinsic contribution shall be referred to herein as an intrinsic modifier and a modifier whose effect on glass properties is dominated by its extrinsic contribution shall be referred to herein as an extrinsic modifier. It is understood, however, that the effect of any modifier on glass properties includes intrinsic and extrinsic contributions and that purely intrinsic and purely extrinsic modifiers represent idealized endpoints of a spectrum of relative importance of intrinsic and extrinsic contributions. A modifier whose intrinsic and extrinsic contributions to glass properties are comparable shall be referred to herein as a mixed modifier. Within the scope of the present description, the properties of modified glasses of greatest importance include CTE, CTE slope, Tzc (zero crossover temperature), and Tf. Accordingly, the designation herein of particular modifiers as intrinsic, extrinsic, or mixed is made with respect to one or more of CTE, CTE slope, Tzc, and Tf.

The present description is concerned with annealing treatments designed to counteract or compensate for the effect of compositional non-uniformity of modifiers on Tf, CTE, CTE slope and/or Tzc of modified titania-silica glasses. The annealing treatments are particularly effective for glasses modified by extrinsic and mixed modifiers. It is important to note that the nature of the annealing treatment needed to compensate for the effect of compositional non-uniformity of extrinsic and mixed modifiers on glass properties will generally differ from the standard constant cooling rate annealing treatments applied to ULE® glass and other commercial glasses.

$TiO_2$ is a prototypical intrinsic modifier of pure silica glass. When compared with pure fused silica of the same OH content, it is known that the addition of ~7.4 wt. % $TiO_2$ lowers the annealing temperature of the glass by about 40° C. From this decrease in annealing temperature, we can estimate that a change in the concentration of $TiO_2$ of 0.1 wt. % in ULE® glass subjected to the standard annealing process (which includes cooling at a constant rate of 3° C./hr) will produce a decrease in Tf of ~0.5° C. Based on a decrease in Tf of ~0.5° C., we would expect an increase in CTE of ~0.3 ppb/K. This increase reflects the effect of $TiO_2$ on the relaxation of the structure of the glass and corresponds to the extrinsic contribution of 0.1 wt. % $TiO_2$ to CTE. Direct measurements indicate, however, that an increase in the $TiO_2$ concentration of 0.1 wt. % of ULE® glass leads to an increase in CTE of ~8 ppb/K under standard annealing conditions. The ~7.7 ppb/K excess over the ~0.3 ppb/K extrinsic contribution represents the intrinsic contribution of 0.1 wt % $TiO_2$ to CTE. The intrinsic contribution is a direct chemical effect associated with the addition of $TiO_2$ and is observed to dominate over the indirect structural (extrinsic) effect associated with the change in Tf by a factor of ~25. For this reason $TiO_2$ is regarded as an intrinsic modifier of CTE.

Extrinsic modifiers include F, OH, Cl, and other modifiers that have a strong influence on the structural relaxation of a glass. Modifiers such as OH or F have a significant impact on CTE through a strong influence on structural relaxation phenomena in the glass without having a large direct chemical effect on CTE. Addition of ~1 wt. % F to ULE® glass, for example, can produce a decrease of ~100° C. in Tf for annealing processes conducted at the same constant cooling rate. A decrease in Tf of ~100° C. produces a change in CTE of ~60 ppb/K, which is significantly greater than the direct chemical (intrinsic) effect associated with the addition of ~1 wt. % F (estimated to be ~26 ppb/K). For this reason, F is regarded as an extrinsic modifier of CTE.

Mixed modifiers include $B_2O_3$ and other modifiers having comparable intrinsic and extrinsic contributions to glass properties.

For glasses used as substrate materials for mirrors in EUVL projection optics, it is important for the glass to have a high degree of spatial uniformity in its thermal expansion properties. When CTE and/or Tzc are controlled by an intrinsic modifier, as in the case of commercially available ULE® glass, the compositional uniformity of the glass will directly determine the spatial uniformity of the thermal properties. There will be a high degree of correlation between spatial uniformity of composition and spatial uniformity of CTE and Tzc. Small variations in compositional uniformity lead to local differences in CTE that compromise glass figure in EUVL applications. It is believed that no practical annealing method can be used to compensate for non-uniformities in CTE resulting from non-uniformities of modifier concentration when the modifier is an intrinsic modifier.

A mirror substrate with concentration variations in an extrinsic modifier, in contrast, can be annealed in such a way to produce a spatially uniform CTE despite compositional non-uniformities. This follows because the primary effect of an extrinsic modifier on CTE is through Tf and annealing provides direct control of Tf through control of the structural relaxation of the glass. As a result, annealing treatments can be designed to compensate for spatial non-uniformities in CTE originating from spatial non-uniformities in Tf caused by spatial non-uniformities in the concentration of an extrinsic modifier.

In the case of a mixed modifier, annealing may be able to compensate for CTE non-uniformities caused by compositional non-uniformities of the modifier. In instances in which the intrinsic contribution and extrinsic contribution of a mixed modifier have opposite effects on CTE (e.g. the intrinsic contribution increases CTE and the extrinsic contribution decreases CTE or vice versa), it is generally possible to anneal the material to control the extrinsic effect of the mixed modifier on CTE in such a way that it cancels the non-uniformities in the intrinsic effect of the mixed modifier on CTE caused by compositional variation. In instances in which the intrinsic contribution and extrinsic contribution of a mixed modifier influence CTE in the same direction (e.g. the intrinsic and extrinsic contributions both lead to an increase or a decrease in CTE), annealing treatments can, at a minimum, reduce the extrinsic contribution to CTE so that non-uniformities in CTE caused by compositional non-uniformities are limited to primarily the intrinsic contribution. As discussed hereinbelow, however, it may be also possible to design an annealing process so that it induces a change in extrinsic contribution to CTE that offsets variations in CTE caused by intrinsic contributions resulting from compositional non-uniformity. These annealing treatments include a cool down followed by a mild heating step before returning the glass to room temperature. Such annealing treatments are referred to herein as inversion anneals.

The glasses to which the annealing treatments are applied are modified titania-silica ($TiO_2$-$SiO_2$) glasses. The modified titania-silica glasses have a $TiO_2$ concentration of at least 7.0 wt %, an $SiO_2$ concentration of at least 79.0 wt %, and a modifier concentration of at least 0.1 wt %. In one embodiment, the glasses contain 7.0 wt %-13.0 wt % $TiO_2$, 79.0 wt %-92.9 wt % $SiO_2$, and 0.1 wt %-8.0 wt % modifier. The modifier concentration may alternatively be in the range from 0.5 wt % to 7.5 wt %, or in the range from 1.0 wt % to 7.0 wt %, or in the range from 2.0 wt % to 6.0 wt %. In another embodiment, the glasses contain 7.5 wt %-12.5 wt % $TiO_2$, 79.5 wt %-92.4 wt % $SiO_2$, and 0.1 wt %-8.0 wt % modifier. The modifier concentration may alternatively be in the range from 0.5 wt % to 7.5 wt %, or in the range from 1.0 wt % to 7.0 wt %, or in the range from 2.0 wt % to 6.0 wt %. In one embodiment, the glasses contain 8.0 wt %-12.0 wt % $TiO_2$, 80.0 wt %-91.9 wt % $SiO_2$, and 0.1 wt %-8.0 wt % modifier. The modifier concentration may alternatively be in the range from 0.5 wt % to 7.5 wt %, or in the range from 1.0 wt % to 7.0 wt %, or in the range from 2.0 wt % to 6.0 wt %. Modifiers include intrinsic, extrinsic, and mixed modifiers. Representative modifiers include F, Cl, OH, and B.

The glasses to which present annealing treatments are applied can be prepared in a variety of ways. The benefits of the present annealing treatments are general and not limited to a particular method of preparing the glass. Methods for forming modified titania-silica glasses include melt processes, sol-gel processes, sputtering, vapor deposition, and evaporation processes. The process may include forming a soot blank and consolidating the soot blank to form a glass. A soot blank can be made by many preparation techniques including, but not limited to, sol-gel, gel casting, soot pressing (wet or dry), batching, pyrolysis, spray pyrolysis, outside vapor deposition, axial vapor deposition, the direct process, plasma process, chemical vapor deposition, and other processes known in the art. Modifiers can be incorporated in many ways, such as by adding a modifier precursor to a sol-gel slurry before gelation or spray drying, during laydown in an OVD/AVD process or the direct process or by providing a modifier precursor during consolidation. Modified titania-silica soot can also be prepared by flame hydrolysis or oxidation of mixed vapors of precursors for the modifier, Ti and Si. This soot can then be shaped in to an article by axial pressing, radial pressing or cold isostatic pressing.

Among the methods for forming the soot blank are:
(1) The OVD (outside vapor deposition) process, in which a soot blank is made in a burner by the combustion of a silica precursor, a titania precursor, and optionally one or more modifier precursors and the soot is collected on a mandrel. Alternatively, the modifier precursor may be excluded from the combustion process and provided during consolidation to form a modified titania-silica glass.
(2) Soot pressing of a soot made by the combustion of a silica precursor, a titania precursor, and optionally one or more modifier precursors in a burner. Alternatively, the one or more modifier precursors may be provided during the consolidation phase instead of being included during the combustion phase.
(3) A sol gel process in which titania-silica soot is made into a sol using a solvent in which optionally one or more modifier precursors are dissolved or dispersed and formed into a shape by gelation of the sol and dried to form porous modified or unmodified titania-silica articles that are then consolidated. In another embodiment, the soot used in the sol gel process is one in which the one or more modifier precursors are added during the formation of the titania-silica soot as described above in Item (2). The modifier precursor(s) may alternatively be provided during the sol phase of the preparation and may participate in the gelation reaction to form a porous modified titania-silica article.

Representative silicon precursors for burner processes include $SiCl_4$ and OMCTS (octamethylcyclotetrasiloxane). Representative titanium precursors for burner processes include $TiCl_4$ and titanium tetraisopropoxide. Representative doping precursors for burner processes include $SiF_4$, trisopropyl borate, triethyl borate, and trimethyl borate. Representative precursors for silicon, titanium, and modifiers in sol-gel processes include alkoxides. Examples include $Si(OCH_3)_4$, $Si(OC_2H_5)_4$, $Si(OR)_4$ (R is an alkyl group), $Ti(OR)_4$, and, $M(OR)_x$, where R is an alkyl group, M is a metal, and x is an integer corresponding to the coordination number of the metal.

In one aspect, the present annealing treatments include cooling a modified titania-silica glass from an elevated temperature to an intermediate temperature, holding the glass at the intermediate temperature for an extended period of time, and cooling the glass from the intermediate temperature to a final temperature. The annealing treatment may further include heating the modified titania-silica glass to the elevated temperature before cooling to the intermediate temperature.

The elevated temperature may be a temperature above 825° C., or above 850° C., above 875° C., or above 900° C., or above 925° C., or above 950° C. The rate of cooling from the elevated temperature to the intermediate temperature may be at least 1° C./hr, or at least 2° C./hr, or at least 3° C./hr, or at least 5° C./hr.

The intermediate temperature may be a temperature above 600° C., or above 650° C., above 700° C., or above 750° C., or between 650° C. and 800° C., or between 675° C. and 775° C., or between 750° C. and 850° C., or between 775° C. and 825° C., or between 775° C. and 800° C., or between 800° C. and 825° C. The hold time at the intermediate temperature may be at least 10 hours, or at least 20 hours, or at least 50 hours, or at least 75 hours, or at least 100 hours, or at least 150 hours, or at least 200 hours. Selection of the intermediate temperature controls the fictive temperature of the glass. Lower intermediate temperatures are needed to achieve lower fictive temperatures (and smaller CTE slopes), but require longer processing times. Similarly, selection of the hold time reflects a compromise between the desire to achieve tight control over the uniformity of fictive temperature and convenience of production. At a particular intermediate temperature, longer hold times reduce the spatial non-uniformity in fictive temperature, but necessarily increase processing times and costs.

The final temperature may be a temperature at least 100° C. less than the intermediate temperature, or a temperature at least 200° C. less than the intermediate temperature, or a temperature at least 300° C. less than the intermediate temperature, or a temperature at least 500° C. less than the intermediate temperature, or room temperature. The cooling rate from the intermediate temperature to the final temperature may be at least 10° C./hr, or at least 25° C./hr, or at least 50° C./hr. In one embodiment, the cooling rate from the intermediate temperature to the final temperature is the natural cooling rate of the furnace. As defined herein, the natural cooling rate of the furnace is the rate of cooling that occurs when the glass is left in the furnace and the furnace is turned off.

In alternative embodiments, the constant temperature hold at the intermediate temperature is replaced by a slow cool from the intermediate temperature, where the slow cool is followed by the cool to the final temperature. The slow cool may occur from the intermediate temperature to a lower temperature, where the lower temperature is no more than 20° C. less than the intermediate temperature, or no more than 10° C. less than the intermediate temperature, or no more than 5° C. less than the intermediate temperature, or no more than 3° C. less than the intermediate temperature, or no more than 2° C. less than the intermediate temperature, or no more than 1° C. less than the intermediate temperature. The slow cool may be performed at a cooling rate of less than 1.0° C./hr, or less than 0.75° C./hr, or less than 0.5° C./hr, or less than 0.25° C./hr, or less than 0.10° C./hr. The time of the slow cool from the intermediate temperature to the lower temperature may be at least 10 hours, or at least 20 hours, or at least 50 hours, or at least 75 hours, or at least 100 hours, or at least 150 hours, or at least 200 hours.

In another aspect, the present annealing treatments include a heating step before the cooling to the final temperature. The heating step may be included in annealing treatments that include a constant temperature hold at the intermediate temperature or in annealing treatments that include a slow cool from the intermediate temperature to a lower temperature. In embodiments with a constant temperature hold at the intermediate temperature, the heating step includes heating from the intermediate temperature to a higher temperature, where the higher temperature is no more than 25° C. above the intermediate temperature, or no more than 15° C. above the intermediate temperature, or no more than 10° C. above the intermediate temperature, or no more than 5° C. above the intermediate temperature, or in the range from 5° C. to 25° C. above the intermediate temperature, or in the range from 5° C. to 15° C. above the intermediate temperature. The glass may be held at the higher temperature for a time period lasting at least 5 hours, or at least 10 hours, or at least 25 hours, or at least 50 hours. Heating to the higher temperature may be followed by cooling from the higher temperature to the final temperature as described hereinabove for cooling from the intermediate temperature to the final temperature.

In embodiments with a slow cool from the intermediate temperature to a lower temperature, the heating step includes heating from the lower temperature to a higher temperature, where the higher temperature is no more than 15° C. above the lower temperature, or no more than 10° C. above the lower temperature, or no more than 5° C. above the lower temperature. The glass may be held at the higher temperature for a time period lasting at least 5 hours, or at least 10 hours, or at least 25 hours, or at least 50 hours. Heating to the higher temperature may be followed by cooling from the higher temperature to the final temperature as described hereinabove for cooling from the intermediate temperature to the final temperature.

Glasses processed in accordance with the present annealing treatments exhibit high spatial uniformity in glass properties. Illustrative glass properties having high spatial uniformity include fictive temperature, CTE, and CTE slope. High spatial uniformity of a glass property corresponds to low peak-to-valley variability in the glass property. As described more fully hereinbelow, spatial uniformity of modifiers in modified titania-silica glass is one factor that influences peak-to-valley variability of glass properties. Spatial non-uniformities in modifier concentration produce regions of high modifier concentration and regions of low modifier concentration in the glass. In the context of the present description, peak-to-valley variability of a glass property is defined on the basis of the spatial non-uniformity of a specified modifier concentration in the glass. More specifically, peak-to-valley variability of a glass property refers to the difference between the value of the property in a region of maximum modifier concentration in the glass and value of the property in a region of minimum modifier concentration in the glass. Peak-to-valley variability in a glass property may also be referred to herein as peak-to-valley variation in the glass property or peak-to-valley non-uniformity in the glass property.

The modified titania-silica glasses feature low CTE slopes and high spatial uniformity in CTE. In one embodiment, a piece of the glass having a volume of at least 5000 cm$^3$ has an average CTE slope less than 1.2 ppb/K$^2$, or less than 1.0 ppb/K$^2$, or less than 0.8 ppb/K$^2$, and a peak-to-valley variation in CTE of less than 5 ppb/K. In another embodiment, a piece of the glass having a volume of at least 1000 cm$^3$ has an average CTE slope less than 1.2 ppb/K$^2$, or less than 1.0 ppb/K$^2$, or less than 0.8 ppb/K$^2$, and a peak-to-valley variation in CTE of less than 3 ppb/K. In one embodiment, a piece of the glass having a volume of at least 500 cm$^3$ has an average CTE slope less than 1.2 ppb/K$^2$, or less than 1.0 ppb/K$^2$, or less than 0.8 ppb/K$^2$, and a peak-to-valley variation in CTE of less than 2 ppb/K. In one embodiment, a piece of the glass having a volume of at least 100 cm$^3$ has an average CTE slope less than 1.2 ppb/K$^2$, or less than 1.0 ppb/K$^2$, or less than 0.8 ppb/K$^2$, and a peak-to-valley variation in CTE of less than 1 ppb/K. In a further embodiment, a piece of the glass having a volume of at least 50 cm$^3$ has an average CTE slope less than 1.2 ppb/K$^2$, or less than 1.0 ppb/K$^2$, or less than 0.8 ppb/K$^2$, and a peak-to-valley variation in CTE of less than 0.5 ppb/K In one embodiment, a piece of the glass having a volume of at least 50 cm$^3$ has an average CTE slope less than 1.2 ppb/K$^2$, or less than 1.0 ppb/K$^2$, or less than 0.8 ppb/K$^2$, a peak-to-valley variation in CTE of less than 5 ppb/K, and an average modifier concentration of at least 0.1 wt %. In another embodiment, a piece of the glass having a volume of at least 50 cm$^3$ has an average CTE slope less than 1.2 ppb/K$^2$, or less than 1.0 ppb/K$^2$, or less than 0.8 ppb/K$^2$, a peak-to-valley variation in CTE of less than 3 ppb/K, and an average modifier concentration of at least 0.5 wt %. In one embodiment a piece of the glass having a volume of at least 50 cm$^3$ has an average CTE slope less than 1.2 ppb/K$^2$, or less than 1.0 ppb/K$^2$, or less than 0.8 ppb/K$^2$, a peak-to-valley variation in CTE of less than 2 ppb/K, and an average modifier concentration of at least 1.0 wt %. In one embodiment, a piece of the glass having a volume of at least 50 cm$^3$ has an average CTE slope less than 1.2 ppb/K$^2$, or less than 1.0 ppb/K$^2$, or less than 0.8 ppb/K$^2$, a peak-to-valley variation in CTE of less than 1 ppb/K, and an average modifier concentration of at least 2.0 wt %. In a further embodiment, a piece of the glass having a volume of at least 50 cm$^3$ has an average CTE slope less than 1.2 ppb/K$^2$, or less than 1.0 ppb/K$^2$, or less than 0.8 ppb/K$^2$, a peak-to-valley variation in CTE of less than 0.5 ppb/K, and an average modifier concentration of at least 3.0 wt %.

In still another aspect, the modified titania-silica glasses feature low CTE slopes and high spatial uniformity in CTE when the concentration of the modifier is spatially non-uniform. In one embodiment, the glass has an average CTE slope less than 1.2 ppb/K$^2$, or less than 1.0 ppb/K$^2$, or less than 0.8 ppb/K$^2$, a peak-to-valley variation in CTE of less than 5 ppb/K, an average modifier concentration of at least 0.1 wt %, and a peak-to-valley variation in modifier concentration of at least 0.01 wt %. In another embodiment, the glass has an average CTE slope less than 1.2 ppb/K$^2$, or less than 1.0 ppb/K$^2$, or less than 0.8 ppb/K$^2$, a peak-to-valley variation in CTE of less than 5 ppb/K, an average modifier concentration of at least 0.1 wt %, and a peak-to-valley variation in modifier concentration of at least 0.02 wt %. In still another embodiment, the glass has an average CTE slope less than 1.2 ppb/K$^2$, or less than 1.0 ppb/K$^2$, or less than 0.8 ppb/K$^2$, a peak-to-valley variation in CTE of less than 5 ppb/K, an average modifier concentration of at least 0.1 wt %, and a peak-to-valley variation in modifier concentration of at least 0.03 wt %. In a further embodiment, the glass has an average CTE slope less than 1.2 ppb/K$^2$, or less than 1.0 ppb/K$^2$, or less than 0.8 ppb/K$^2$, a peak-to-valley variation in CTE of less than 5 ppb/K, an average modifier concentration of at least 0.1 wt %, and a peak-to-valley variation in modifier concentration of at least 0.05 wt %.

In one embodiment, the glass has an average CTE slope less than 1.2 ppb/K$^2$, or less than 1.0 ppb/K$^2$, or less than 0.8 ppb/K$^2$, a peak-to-valley variation in CTE of less than 2 ppb/K, an average modifier concentration of at least 0.1 wt %, and a peak-to-valley variation in modifier concentration of at least 0.01 wt %. In another embodiment, the glass has an average CTE slope less than 1.2 ppb/K$^2$, or less than 1.0 ppb/K$^2$, or less than 0.8 ppb/K$^2$, a peak-to-valley variation in CTE of less than 2 ppb/K, an average modifier concentration of at least 0.1 wt %, and a peak-to-valley variation in modifier concentration of at least 0.02 wt %. In still another embodiment, the glass has an average CTE slope less than 1.2 ppb/K$^2$, or less than 1.0 ppb/K$^2$, or less than 0.8 ppb/K$^2$, a peak-to-valley variation in CTE of less than 2 ppb/K, an average modifier concentration of at least 0.1 wt %, and a peak-to-valley variation in modifier concentration of at least 0.03 wt %. In a further embodiment, the glass has an average CTE slope less than 1.2 ppb/K$^2$, or less than 1.0 ppb/K$^2$, or less than 0.8 ppb/K$^2$, a peak-to-valley variation in CTE of less than 2 ppb/K, an average modifier concentration of at least 0.1 wt %, and a peak-to-valley variation in modifier concentration of at least 0.05 wt %.

In one embodiment, the glass has an average CTE slope less than 1.2 ppb/K$^2$, or less than 1.0 ppb/K$^2$, or less than 0.8 ppb/K$^2$, a peak-to-valley variation in CTE of less than 1 ppb/K, an average modifier concentration of at least 0.1 wt %, and a peak-to-valley variation in modifier concentration of at least 0.01 wt %. In another embodiment, the glass has an average CTE slope less than 1.2 ppb/K$^2$, or less than 1.0 ppb/K$^2$, or less than 0.8 ppb/K$^2$, a peak-to-valley variation in CTE of less than 1 ppb/K, an average modifier concentration of at least 0.1 wt %, and a peak-to-valley variation in modifier concentration of at least 0.02 wt %. In still another embodiment the glass has an average CTE slope less than 1.2 ppb/K$^2$, or less than 1.0 ppb/K$^2$, or less than 0.8 ppb/K$^2$, a peak-to-valley variation in CTE of less than 1 ppb/K, an average modifier concentration of at least 0.1 wt %, and a peak-to-valley variation in modifier concentration of at least 0.03 wt %. In a further embodiment, the glass has an average CTE slope less than 1.2 ppb/K$^2$, or less than 1.0 ppb/K$^2$, or less than 0.8 ppb/K$^2$, a peak-to-valley variation in CTE of less than 1 ppb/K, an average modifier concentration of at least 0.1 wt %, and a peak-to-valley variation in modifier concentration of at least 0.05 wt %.

In one embodiment, the glass has an average CTE slope less than 1.2 ppb/K$^2$, or less than 1.0 ppb/K$^2$, or less than 0.8 ppb/K$^2$, a peak-to-valley variation in CTE of less than 0.5 ppb/K, an average modifier concentration of at least 0.1 wt %, and a peak-to-valley variation in modifier concentration of at least 0.01 wt %. In another embodiment, the glass has an average CTE slope less than 1.2 ppb/K$^2$, or less than 1.0 ppb/K$^2$, or less than 0.8 ppb/K$^2$, a peak-to-valley variation in CTE of less than 0.5 ppb/K, an average modifier concentration of at least 0.1 wt %, and a peak-to-valley variation in modifier concentration of at least 0.02 wt %. In still another embodiment, the glass has an average CTE slope less than 1.2 ppb/K$^2$, or less than 1.0 ppb/K$^2$, or less than 0.8 ppb/K$^2$, a peak-to-valley variation in CTE of less than 0.5 ppb/K, an average modifier concentration of at least 0.1 wt %, and a peak-to-valley variation in modifier concentration of at least 0.03 wt %. In a further embodiment, the glass has an average CTE slope less than 1.2 ppb/K$^2$, or less than 1.0 ppb/K$^2$, or less than 0.8 ppb/K$^2$, a peak-to-valley variation in CTE of less than 0.5 ppb/K, an average modifier concentration of at least 0.1 wt %, and a peak-to-valley variation in modifier concentration of at least 0.05 wt %.

In one embodiment, the glass has an average CTE slope less than 1.2 ppb/K$^2$, or less than 1.0 ppb/K$^2$, or less than 0.8 ppb/K$^2$, a peak-to-valley variation in CTE of less than 5 ppb/K, an average modifier concentration of at least 0.5 wt %, and a peak-to-valley variation in modifier concentration of at least 0.02 wt %. In another embodiment, the glass has an average CTE slope less than 1.2 ppb/K$^2$, or less than 1.0 ppb/K$^2$, or less than 0.8 ppb/K$^2$, a peak-to-valley variation in CTE of less than 5 ppb/K, an average modifier concentration of at least 0.5 wt %, and a peak-to-valley variation in modifier concentration of at least 0.04 wt %. In still another embodiment, the glass has an average CTE slope less than 1.2 ppb/K$^2$, or less than 1.0 ppb/K$^2$, or less than 0.8 ppb/K$^2$, a peak-to-valley variation in CTE of less than 5 ppb/K, an average modifier concentration of at least 0.5 wt %, and a peak-to-valley variation in modifier concentration of at least 0.07 wt %. In a further embodiment, the glass has an average CTE slope less than 1.2 ppb/K$^2$, or less than 1.0 ppb/K$^2$, or less than 0.8 ppb/K$^2$, a peak-to-valley variation in CTE of less than 5 ppb/K, an average modifier concentration of at least 0.5 wt %, and a peak-to-valley variation in modifier concentration of at least 0.10 wt %.

In one embodiment, the glass has an average CTE slope less than 1.2 ppb/K$^2$, or less than 1.0 ppb/K$^2$, or less than 0.8 ppb/K$^2$, a peak-to-valley variation in CTE of less than 2 ppb/K, an average modifier concentration of at least 0.5 wt %, and a peak-to-valley variation in modifier concentration of at least 0.02 wt %. In another embodiment, the glass has an average CTE slope less than 1.2 ppb/K$^2$, or less than 1.0 ppb/K$^2$, or less than 0.8 ppb/K$^2$, a peak-to-valley variation in CTE of less than 2 ppb/K, an average modifier concentration of at least 0.5 wt %, and a peak-to-valley variation in modifier concentration of at least 0.04 wt %. In still another embodiment, the glass has an average CTE slope less than 1.2 ppb/K$^2$, or less than 1.0 ppb/K$^2$, or less than 0.8 ppb/K$^2$, a peak-to-valley variation in CTE of less than 2 ppb/K, an average modifier concentration of at least 0.5 wt %, and a peak-to-valley variation in modifier concentration of at least 0.07 wt %. In a further embodiment the glass has an average CTE slope less than 1.2 ppb/K$^2$, or less than 1.0 ppb/K$^2$, or less than 0.8 ppb/K$^2$, a peak-to-valley variation in CTE of less than 2 ppb/K, an average modifier concentration of at least 0.5 wt %, and a peak-to-valley variation in modifier concentration of at least 0.10 wt %.

In one embodiment, the glass has an average CTE slope less than 1.2 ppb/$K^2$, or less than 1.0 ppb/$K^2$, or less than 0.8 ppb/$K^2$, a peak-to-valley variation in CTE of less than 1 ppb/K, an average modifier concentration of at least 0.5 wt %, and a peak-to-valley variation in modifier concentration of at least 0.02 wt %. In another embodiment, the glass has an average CTE slope less than 1.2 ppb/$K^2$, or less than 1.0 ppb/$K^2$, or less than 0.8 ppb/$K^2$, a peak-to-valley variation in CTE of less than 1 ppb/K, an average modifier concentration of at least 0.5 wt %, and a peak-to-valley variation in modifier concentration of at least 0.04 wt %. In still another embodiment, the glass has an average CTE slope less than 1.2 ppb/$K^2$, or less than 1.0 ppb/$K^2$, or less than 0.8 ppb/$K^2$, a peak-to-valley variation in CTE of less than 1 ppb/K, an average modifier concentration of at least 0.5 wt %, and a peak-to-valley variation in modifier concentration of at least 0.07 wt %. In a further embodiment, the glass has an average CTE slope less than 1.2 ppb/$K^2$, or less than 1.0 ppb/$K^2$, or less than 0.8 ppb/$K^2$, a peak-to-valley variation in CTE of less than 1 ppb/K, an average modifier concentration of at least 0.5 wt %, and a peak-to-valley variation in modifier concentration of at least 0.10 wt %.

In one embodiment, the glass has an average CTE slope less than 1.2 ppb/$K^2$, or less than 1.0 ppb/$K^2$, or less than 0.8 ppb/$K^2$, a peak-to-valley variation in CTE of less than 0.5 ppb/K, an average modifier concentration of at least 0.5 wt %, and a peak-to-valley variation in modifier concentration of at least 0.02 wt %. In another embodiment, the glass has an average CTE slope less than 1.2 ppb/$K^2$, or less than 1.0 ppb/$K^2$, or less than 0.8 ppb/$K^2$, a peak-to-valley variation in CTE of less than 0.5 ppb/K, an average modifier concentration of at least 0.5 wt %, and a peak-to-valley variation in modifier concentration of at least 0.04 wt %. In still another embodiment, the glass has an average CTE slope less than 1.2 ppb/$K^2$, or less than 1.0 ppb/$K^2$, or less than 0.8 ppb/$K^2$, a peak-to-valley variation in CTE of less than 0.5 ppb/K, an average modifier concentration of at least 0.5 wt %, and a peak-to-valley variation in modifier concentration of at least 0.07 wt %. In a further embodiment, the glass has an average CTE slope less than 1.2 ppb/$K^2$, or less than 1.0 ppb/$K^2$, or less than 0.8 ppb/$K^2$, a peak-to-valley variation in CTE of less than 0.5 ppb/K, an average modifier concentration of at least 0.5 wt %, and a peak-to-valley variation in modifier concentration of at least 0.10 wt %.

In one embodiment, the glass has an average CTE slope less than 1.2 ppb/$K^2$, or less than 1.0 ppb/$K^2$, or less than 0.8 ppb/$K^2$, a peak-to-valley variation in CTE of less than 5 ppb/K, an average modifier concentration of at least 1.0 wt %, and a peak-to-valley variation in modifier concentration of at least 0.03 wt %. In another embodiment, the glass has an average CTE slope less than 1.2 ppb/$K^2$, or less than 1.0 ppb/$K^2$, or less than 0.8 ppb/$K^2$, a peak-to-valley variation in CTE of less than 5 ppb/K, an average modifier concentration of at least 1.0 wt %, and a peak-to-valley variation in modifier concentration of at least 0.06 wt %. In still another embodiment, the glass has an average CTE slope less than 1.2 ppb/$K^2$, or less than 1.0 ppb/$K^2$, or less than 0.8 ppb/$K^2$, a peak-to-valley variation in CTE of less than 5 ppb/K, an average modifier concentration of at least 1.0 wt %, and a peak-to-valley variation in modifier concentration of at least 0.10 wt %. In a further embodiment, the glass has an average CTE slope less than 1.2 ppb/$K^2$, or less than 1.0 ppb/$K^2$, or less than 0.8 ppb/$K^2$, a peak-to-valley variation in CTE of less than 5 ppb/K, an average modifier concentration of at least 1.0 wt %, and a peak-to-valley variation in modifier concentration of at least 0.15 wt %.

In one embodiment, the glass has an average CTE slope less than 1.2 ppb/$K^2$, or less than 1.0 ppb/$K^2$, or less than 0.8 ppb/$K^2$, a peak-to-valley variation in CTE of less than 2 ppb/K, an average modifier concentration of at least 1.0 wt %, and a peak-to-valley variation in modifier concentration of at least 0.03 wt %. In another embodiment, the glass has an average CTE slope less than 1.2 ppb/$K^2$, or less than 1.0 ppb/$K^2$, or less than 0.8 ppb/$K^2$, a peak-to-valley variation in CTE of less than 2 ppb/K, an average modifier concentration of at least 1.0 wt %, and a peak-to-valley variation in modifier concentration of at least 0.06 wt %. In still another embodiment, the glass has an average CTE slope less than 1.2 ppb/$K^2$, or less than 1.0 ppb/$K^2$, or less than 0.8 ppb/$K^2$, a peak-to-valley variation in CTE of less than 2 ppb/K, an average modifier concentration of at least 1.0 wt %, and a peak-to-valley variation in modifier concentration of at least 0.10 wt %. In a further embodiment, the glass has an average CTE slope less than 1.2 ppb/$K^2$, or less than 1.0 ppb/$K^2$, or less than 0.8 ppb/$K^2$, a peak-to-valley variation in CTE of less than 2 ppb/K, an average modifier concentration of at least 1.0 wt %, and a peak-to-valley variation in modifier concentration of at least 0.15 wt %.

In one embodiment, the glass has an average CTE slope less than 1.2 ppb/$K^2$, or less than 1.0 ppb/$K^2$, or less than 0.8 ppb/$K^2$, a peak-to-valley variation in CTE of less than 1 ppb/K, an average modifier concentration of at least 1.0 wt %, and a peak-to-valley variation in modifier concentration of at least 0.03 wt %. In another embodiment, the glass has an average CTE slope less than 1.2 ppb/$K^2$, or less than 1.0 ppb/$K^2$, or less than 0.8 ppb/$K^2$, a peak-to-valley variation in CTE of less than 1 ppb/K, an average modifier concentration of at least 1.0 wt %, and a peak-to-valley variation in modifier concentration of at least 0.06 wt %. In still another embodiment, the glass has an average CTE slope less than 1.2 ppb/$K^2$, or less than 1.0 ppb/$K^2$, or less than 0.8 ppb/$K^2$, a peak-to-valley variation in CTE of less than 1 ppb/K, an average modifier concentration of at least 1.0 wt %, and a peak-to-valley variation in modifier concentration of at least 0.10 wt %. In a further embodiment, the glass has an average CTE slope less than 1.2 ppb/$K^2$, or less than 1.0 ppb/$K^2$, or less than 0.8 ppb/$K^2$, a peak-to-valley variation in CTE of less than 1 ppb/K, an average modifier concentration of at least 1.0 wt %, and a peak-to-valley variation in modifier concentration of at least 0.15 wt %.

In one embodiment, the glass has an average CTE slope less than 1.2 ppb/$K^2$, or less than 1.0 ppb/$K^2$, or less than 0.8 ppb/$K^2$, a peak-to-valley variation in CTE of less than 0.5 ppb/K, an average modifier concentration of at least 1.0 wt %, and a peak-to-valley variation in modifier concentration of at least 0.03 wt %. In another embodiment, the glass has an average CTE slope less than 1.2 ppb/$K^2$, or less than 1.0 ppb/$K^2$, or less than 0.8 ppb/$K^2$, a peak-to-valley variation in CTE of less than 0.5 ppb/K, an average modifier concentration of at least 1.0 wt %, and a peak-to-valley variation in modifier concentration of at least 0.06 wt %. In still another embodiment, the glass has an average CTE slope less than 1.2 ppb/$K^2$, or less than 1.0 ppb/$K^2$, or less than 0.8 ppb/$K^2$, a peak-to-valley variation in CTE of less than 0.5 ppb/K, an average modifier concentration of at least 1.0 wt %, and a peak-to-valley variation in modifier concentration of at least 0.10 wt %. In a further embodiment, the glass has an average CTE slope less than 1.2 ppb/$K^2$, or less than 1.0 ppb/$K^2$, or less than 0.8 ppb/$K^2$, a peak-to-valley variation in CTE of less than 0.5 ppb/K, an average modifier concentration of at least 1.0 wt %, and a peak-to-valley variation in modifier concentration of at least 0.15 wt %.

In one embodiment, the glass is a modified titania-silica glass having an average modifier concentration of at least 0.1 wt % that includes a high concentration region with a modifier concentration at least 0.01 wt % greater than the average modifier concentration and a low concentration region having a modifier concentration at least 0.01 wt % less than the average modifier concentration, where the coefficient of thermal expansion of the high concentration region and the coefficient of thermal expansion of the low concentration region differ by less than 5 ppb/K, or less than 2 ppb/K, or less than 1 ppb/K, or less than 0.5 ppb/K. The average modifier concentration may be at least 0.2 wt %, or at least 0.3 wt %, or at least 0.5 wt %, or at least 1.0 wt %, or at least 2.0 wt %, or at least 3.0 wt %.

In one embodiment, the glass is a modified titania-silica glass having an average modifier concentration of at least 0.1 wt % that includes a high concentration region with a modifier concentration at least 0.03 wt % greater than the average modifier concentration and a low concentration region having a modifier concentration at least 0.03 wt % less than the average modifier concentration, where the coefficient of thermal expansion of the high concentration region and the coefficient of thermal expansion of the low concentration region differ by less than 5 ppb/K, or less than 2 ppb/K, or less than 1 ppb/K, or less than 0.5 ppb/K. The average modifier concentration may be at least 0.2 wt %, or at least 0.3 wt %, or at least 0.5 wt %, or at least 1.0 wt %, or at least 2.0 wt %, or at least 3.0 wt %.

In one embodiment, the glass is a modified titania-silica glass having an average modifier concentration of at least 0.1 wt % that includes a high concentration region with a modifier concentration at least 0.05 wt % greater than the average modifier concentration and a low concentration region having a modifier concentration at least 0.05 wt % less than the average modifier concentration, where the coefficient of thermal expansion of the high concentration region and the coefficient of thermal expansion of the low concentration region differ by less than 5 ppb/K, or less than 2 ppb/K, or less than 1 ppb/K, or less than 0.5 ppb/K. The average modifier concentration may be at least 0.2 wt %, or at least 0.3 wt %, or at least 0.5 wt %, or at least 1.0 wt %, or at least 2.0 wt %, or at least 3.0 wt %.

In one embodiment, the glass is a modified titania-silica glass having an average modifier concentration of at least 0.2 wt % that includes a high concentration region with a modifier concentration at least 0.10 wt % greater than the average modifier concentration and a low concentration region having a modifier concentration at least 0.10 wt % less than the average modifier concentration, where the coefficient of thermal expansion of the high concentration region and the coefficient of thermal expansion of the low concentration region differ by less than 5 ppb/K, or less than 2 ppb/K, or less than 1 ppb/K, or less than 0.5 ppb/K. The average modifier concentration may be at least 0.3 wt %, or at least 0.5 wt %, or at least 1.0 wt %, or at least 2.0 wt %, or at least 3.0 wt %.

In yet another aspect, the modified titania-silica glass features high spatial uniformity in fictive temperature when the modifier concentration is spatially non-uniform. In one embodiment, the glass has a peak-to-valley variation in fictive temperature less than 3° C., an average modifier concentration of at least 0.1 wt %, and a peak-to-valley modifier concentration of at least 0.01 wt %. In another embodiment, the glass has a peak-to-valley variation in fictive temperature less than 3° C., an average modifier concentration of at least 0.1 wt %, and a peak-to-valley modifier concentration of at least 0.03 wt %. In still another embodiment, the glass has a peak-to-valley variation in fictive temperature less than 3° C., an average modifier concentration of at least 0.1 wt %, and a peak-to-valley modifier concentration of at least 0.05 wt %.

In one embodiment, the glass has a peak-to-valley variation in fictive temperature less than 3° C., an average modifier concentration of at least 0.5 wt %, and a peak-to-valley modifier concentration of at least 0.02 wt %. In another embodiment, the glass has a peak-to-valley variation in fictive temperature less than 3° C., an average modifier concentration of at least 0.5 wt %, and a peak-to-valley modifier concentration of at least 0.05 wt %. In still another embodiment, the glass has a peak-to-valley variation in fictive temperature less than 3° C., an average modifier concentration of at least 0.5 wt %, and a peak-to-valley modifier concentration of at least 0.10 wt %.

In one embodiment, the glass has a peak-to-valley variation in fictive temperature less than 3° C., an average modifier concentration of at least 1.0 wt %, and a peak-to-valley modifier concentration of at least 0.05 wt %. In another embodiment, the glass has a peak-to-valley variation in fictive temperature less than 3° C., an average modifier concentration of at least 1.0 wt %, and a peak-to-valley modifier concentration of at least 0.10 wt %. In still another embodiment, the glass has a peak-to-valley variation in fictive temperature less than 3° C., an average modifier concentration of at least 1.0 wt %, and a peak-to-valley modifier concentration of at least 0.15 wt %.

In one embodiment, the glass is a modified titania-silica glass with an average modifier concentration of at least 0.1 wt % that includes a high concentration region with a modifier concentration at least 0.01 wt % greater than the average modifier concentration and a low concentration region having a modifier concentration at least 0.01 wt % less than the average modifier concentration, where the fictive temperature of the high concentration region differs from the fictive temperature of the low concentration region by less than 3° C., or less than 2° C., or less than 1° C., or less than 0.5° C. The average modifier concentration may be at least 0.2 wt %, or at least 0.3 wt %, or at least 0.5 wt %, or at least 1.0 wt %, or at least 2.0 wt %, or at least 3.0 wt %.

In one embodiment, the glass is a modified titania-silica glass with an average modifier concentration of at least 0.1 wt % that includes a high concentration region with a modifier concentration at least 0.02 wt % greater than the average modifier concentration and a low concentration region having a modifier concentration at least 0.02 wt % less than the average modifier concentration, where the fictive temperature of the high concentration region differs from the fictive temperature of the low concentration region by less than 3° C., or less than 2° C., or less than 1° C., or less than 0.5° C. The average modifier concentration may be at least 0.2 wt %, or at least 0.3 wt %, or at least 0.5 wt %, or at least 1.0 wt %, or at least 2.0 wt %, or at least 3.0 wt %.

In one embodiment, the glass is a modified titania-silica glass with an average modifier concentration of at least 0.1 wt % that includes a high concentration region with a modifier concentration at least 0.03 wt % greater than the average modifier concentration and a low concentration region having a modifier concentration at least 0.03 wt % less than the average modifier concentration, where the fictive temperature of the high concentration region differs from the fictive temperature of the low concentration region by less than 3° C., or less than 2° C., or less than 1° C., or less than 0.5° C. The average modifier concentration may be at least 0.2 wt %, or at least 0.3 wt %, or at least 0.5 wt %, or at least 1.0 wt %, or at least 2.0 wt %, or at least 3.0 wt %.

In one embodiment, the glass is a modified titania-silica glass with an average modifier concentration of at least 0.1 wt % that includes a high concentration region with a modifier concentration at least 0.05 wt % greater than the average modifier concentration and a low concentration region having a modifier concentration at least 0.05 wt % less than the average modifier concentration, where the fictive temperature of the high concentration region differs from the fictive temperature of the low concentration region by less than 3° C., or less than 2° C., or less than 1° C., or less than 0.5° C. The average modifier concentration may be at least 0.2 wt %, or at least 0.3 wt %, or at least 0.5 wt %, or at least 1.0 wt %, or at least 2.0 wt %, or at least 3.0 wt %.

In one embodiment, the glass is a modified titania-silica glass with an average modifier concentration of at least 0.5 wt % that includes a high concentration region with a modifier concentration at least 0.10 wt % greater than the average modifier concentration and a low concentration region having a modifier concentration at least 0.10 wt % less than the average modifier concentration, where the fictive temperature of the high concentration region differs from the fictive temperature of the low concentration region by less than 3° C., or less than 2° C., or less than 1° C., or less than 0.5° C. The average modifier concentration may be at least 1.0 wt %, or at least 2.0 wt %, or at least 3.0 wt %.

EXAMPLES

The following examples illustrate the effect of different annealing treatments on a titania-silica glass modified with F. The results presented in FIGS. 1-7 are calculated results based on accepted models of the properties of titania-silica glass. The titania content of the modeled glass was ~8.1 wt % (FIGS. 1-2) and ~8.4 wt % (FIGS. 3-7). The average concentration of F was 0.8 wt % and the concentration of F had a non-uniformity of ±0.05 wt % relative to the average. The concentration of F varied between 0.75 wt % and 0.85 wt % and may thus be regarded as having a peak-to-valley non-uniformity of 0.1 wt %. The balance of the glass composition was silica.

The examples include calculation of the fictive temperature (Tf) of the glass resulting from various annealing treatments. Separate calculations of fictive temperature were made at regions of the glass having high (0.85 wt %), average (0.80 wt %), and low (0.75 wt %) F concentration. The difference (taken as a positive number) between the fictive temperature of the low F and high F concentration regions may be referred to herein as the peak-to-valley variation in Tf.

FIG. 1 shows the calculated effect of a standard anneal on the fictive temperature of the F-modified titania-silica glass. Trace 110 shows the annealing treatment applied to the glass. The temperature of the glass was ramped up to 950° C., held at 950° C. for ~10 hours, and then ramped down at a constant cooling rate of 3° C./hr. Traces 120, 130, and 140 show the fictive temperature (Tf) of regions of the glass having high (0.85 wt %), average (0.80 wt %), and low (0.75 wt %) F concentration, respectively. The fictive temperature in each region was observed to decrease with cooling and to level off at a constant final value at long times. The results show that fictive temperature decreased with increasing concentration of F. The region of glass with high F concentration had a lower Tf than the region of glass with average F concentration, which had a lower Tf than the region of glass with low F concentration. The lower fictive temperature observed for regions of high F concentration indicates that the structure of regions of glass with higher F concentration relaxed more quickly as the glass cooled than did the structure of regions of glass with lower F concentration. The difference in final Tf for the regions having F concentrations of 0.75 wt % and 0.85 wt % was ~12.6° C. This variation in Tf is far higher than the variation tolerable for EUVL substrate materials.

Figure 2:
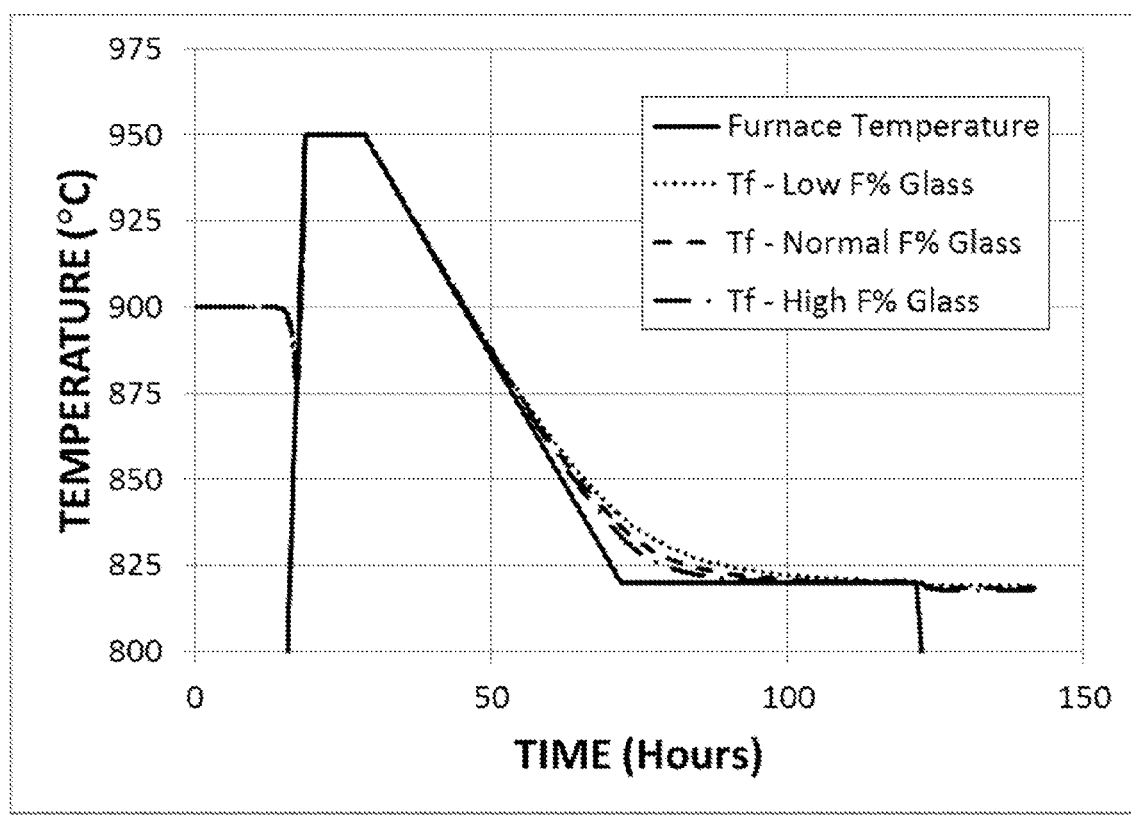
FIG. 2 shows the time variation of the fictive temperature of an F-modified titania-silica glass under annealing conditions that include cooling from 950° C. to 820° C. at a rate of 3° C./hr, holding at 820° C. for 50 hours, and cooling to room temperature at the natural rate.

FIG. 2 shows the calculated effect of an annealing treatment in accordance with an embodiment of the present description on the fictive temperature of the F-modified titania-silica glass. Trace 210 shows the annealing treatment applied to the glass. The temperature of the glass was ramped up to 950° C., held at 950° C. for ~10 hours, and then ramped down at a constant cooling rate of 3° C./hr to a hold temperature of 820° C. The glass was held at 820° C. for 50 hours and then cooled naturally to room temperature. Traces 220, 230, and 240 show the fictive temperature (Tf) of regions of the glass having high (0.85 wt %), average (0.80 wt %), and low (0.75 wt %) F concentration, respectively. The fictive temperature in each region was observed to decrease with cooling and to level off at a constant value toward the end of the isothermal hold at 820° C. A slight decrease in fictive temperature in each of the regions was observed following cooling to room temperature. Inclusion of the isothermal hold in the annealing treatment led to high uniformity in the fictive temperatures of the regions of glass having different F concentration. The difference in final Tf for the regions having F concentrations of 0.75 wt % and 0.85 wt % after natural cooling to room temperature was ~1.3° C., which represents an order of magnitude improvement in the peak-to-valley variation in Tf relative to the annealing treatment shown in FIG. 1.

Figure 3:
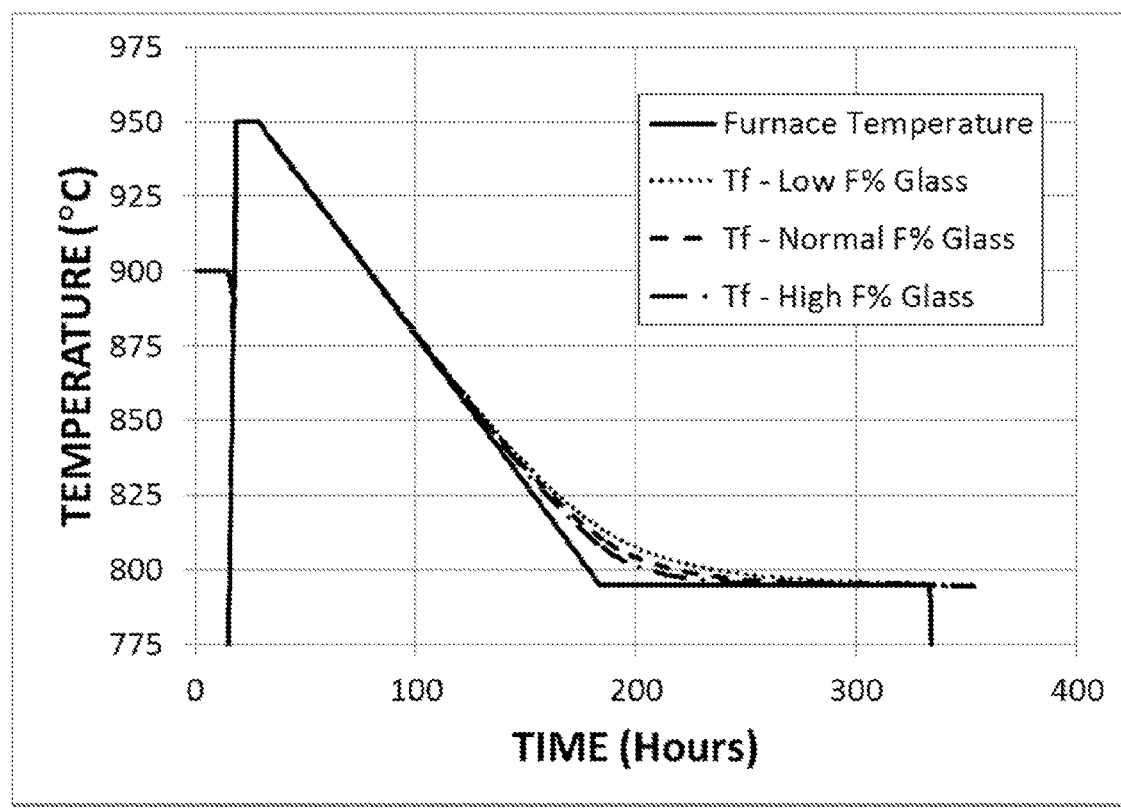
FIG. 3 shows the time variation of the fictive temperature of an F-modified titania-silica glass under annealing conditions that include cooling from 950° C. to 795° C. at a rate of 1° C./hr, holding at 795° C. for 150 hours, and cooling to room temperature at the natural rate.

FIG. 3 shows the calculated effect of an annealing treatment in accordance with an embodiment of the present description on the fictive temperature of the F-modified titania-silica glass. Trace 310 shows the annealing treatment applied to the glass. The temperature of the glass was ramped up to 950° C., held at 950° C. for ~10 hours, and then ramped down at a constant cooling rate of 1° C./hr to a hold temperature of 795° C. The glass was held at 795° C. for 150 hours and then cooled naturally to room temperature. Traces 320, 330, and 340 show the fictive temperature (Tf) of regions of the glass having high (0.85 wt %), average (0.80 wt %), and low (0.75 wt %) F concentration, respectively. The fictive temperature in each region was observed to decrease with cooling and to level off at a constant value toward the end of the isothermal hold at 795° C. A slight decrease in fictive temperature in each of the regions was observed following cooling to room temperature. Inclusion of the isothermal hold in the annealing treatment led to high uniformity in the fictive temperatures of the regions of glass having different F concentration. The difference in final Tf for the regions having F concentrations of 0.75 wt % and 0.85 wt % after natural cooling to room temperature was ~0.7° C. The lower holding temperature and longer holding time used in the annealing treatment depicted in FIG. 3 led to a reduction in the peak-to-valley variation in Tf relative to the annealing treatment shown in FIG. 2. The decrease in fictive temperature associated with natural cooling to room temperature was also less for the annealing treatment shown by trace 310 of FIG. 3 than for the annealing treatment shown by trace 210 of FIG. 2.

Figure 4:
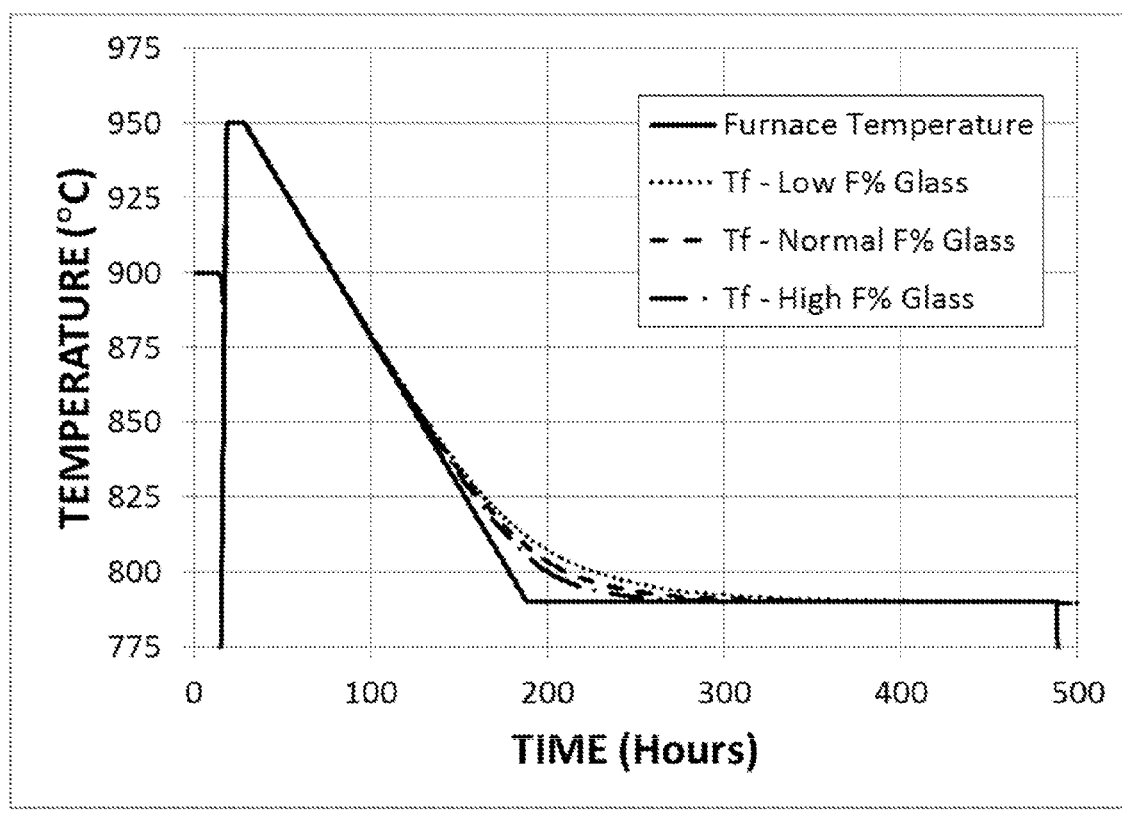
FIG. 4 shows the time variation of the fictive temperature of an F-modified titania-silica glass under annealing conditions that include cooling from 950° C. to 790° C. at a rate of 1° C./hr, holding at 790° C. for 300 hours, and cooling to room temperature at the natural rate.

FIG. 4 shows the calculated effect of an annealing treatment in accordance with an embodiment of the present description on the fictive temperature of the F-modified titania-silica glass. Trace 410 shows the annealing treatment applied to the glass. The temperature of the glass was ramped up to 950° C., held at 950° C. for ~10 hours, and then ramped down at a constant cooling rate of 1° C./hr to a hold temperature of 790° C. The glass was held at 790° C. for 300 hours and then cooled naturally to room temperature. Traces 420, 430, and 440 show the fictive temperature (Tf) of regions of the glass having high (0.85 wt %), average (0.80 wt %), and low (0.75 wt %) F concentration, respectively. The fictive temperature in each region was observed to decrease with cooling and to level off at a constant value toward the end of the isothermal hold at 790° C. A slight decrease in fictive temperature in each of the regions was observed following cooling to room temperature. Inclusion of the isothermal hold in the annealing treatment led to high uniformity in the fictive temperatures of the regions of glass having different F concentration. The difference in final Tf for the regions having F concentrations of 0.75 wt % and 0.85 wt % after natural cooling to room temperature was ~0.3° C. The lower holding temperature and longer holding time used in the annealing treatment depicted in FIG. 4 led to a reduction in the peak-to-valley variation in Tf relative to the annealing treatments shown in FIGS. 2 and 3. The decrease in fictive temperature associated with natural cooling to room temperature was also less for the annealing treatment shown by trace 410 of FIG. 4 than for the annealing treatments shown by trace 210 of FIG. 2 and trace 310 of FIG. 3.

Figure 5:
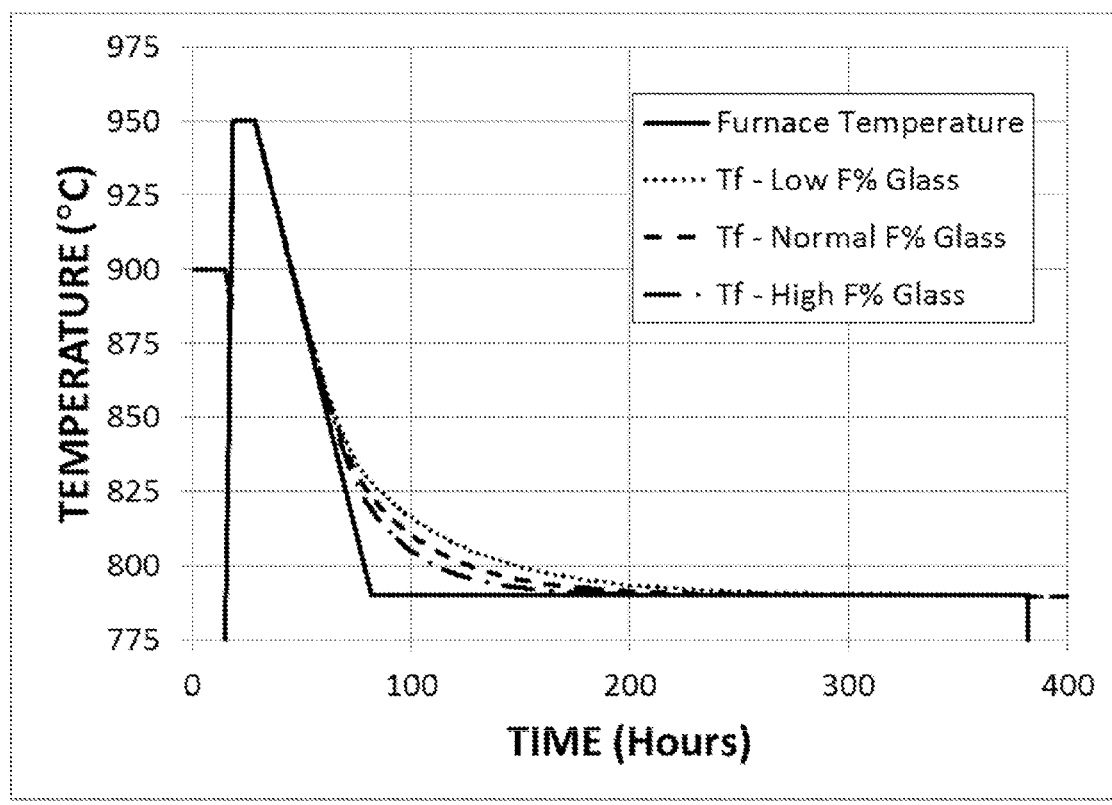
FIG. 5 shows the time variation of the fictive temperature of an F-modified titania-silica glass under annealing conditions that include cooling from 950° C. to 790° C. at a rate of 3° C./hr, holding at 790° C. for 300 hours, and cooling to room temperature at the natural rate.

FIG. 5 is a variation of FIG. 4 in which the cooling rate from 950° C. to the hold temperature of 790° C. was 3° C./hr. The temperature of the glass was ramped up to 950° C., held at 950° C. for ~10 hours, and then ramped down at a constant cooling rate of 3° C./hr to a hold temperature of 790° C. The glass was held at 790° C. for 300 hours and then cooled naturally to room temperature. Traces 520, 530, and 540 show the fictive temperature (Tf) of regions of the glass having high (0.85 wt %), average (0.80 wt %), and low (0.75 wt %) F concentration, respectively. The fictive temperature and peak-to-valley variation in Tf observed in FIG. 5 is essentially the same as observed in FIG. 4. The results show that the final Tf and spatial uniformity of Tf were determined primarily by the isothermal hold temperature and that the difference in initial cooling rate had little effect on Tf or its uniformity. The faster initial cooling rate shown in FIG. 5 reduces overall processing time.

Figure 6:
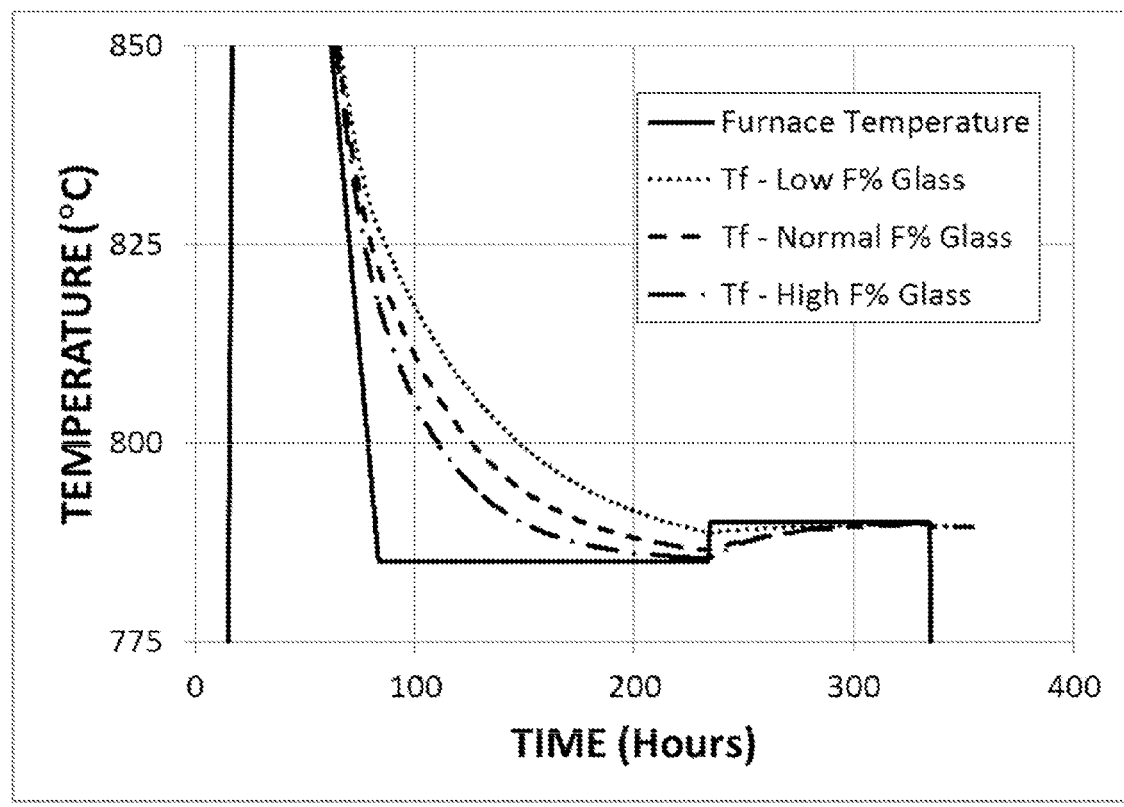
FIG. 6 shows the time variation of the fictive temperature of a modified titania-silica glass under annealing conditions that include cooling from 950° C. to 785° C. at a rate of 3° C./hr, holding at 785° C. for 150 hours, heating from 785° C. to 790° C., holding at 790° C. for 100 hours, and cooling to room temperature at the natural rate.

FIG. 6 shows the calculated effect of an annealing treatment in accordance with an embodiment of the present description on the fictive temperature of the F-modified titania-silica glass. The embodiment of FIG. 6 includes a heating step after an isothermal hold step. Trace 610 shows the annealing treatment applied to the glass. The temperature of the glass was ramped up to 950° C., held at 950° C. for ~10 hours, and then ramped down at a constant cooling rate of 3° C./hr to a hold temperature of 785° C. The glass was held at 785° C. for 150 hours and then heated to 790° C. The glass was held at 790° C. for 100 hours and then cooled naturally to room temperature. Traces 620, 630, and 640 show the fictive temperature (Tf) of regions of the glass having high (0.85 wt %), average (0.80 wt %), and low (0.75 wt %) F concentration, respectively. The fictive temperature in each region was observed to decrease with cooling. The peak-to-valley variability in Tf at the end of the hold at 785° C. was ~3° C., with the region of glass with high F concentration having a lower Tf than the region of glass with low F concentration. Heating to 790° C. and holding at 790° C. for 100 hours reduced the peak-to-valley variability in Tf to 0.2° C. Narrowing of the non-uniformity of Tf upon heating and holding at 790° C. was a consequence of a greater increase in Tf for regions of the glass having high F concentration relative to regions of the glass having low F concentration. As occurs with cooling, regions of high F concentration respond more quickly to increases in temperature than regions of low F concentration.

The annealing treatments of FIG. 5 and FIG. 6 were both intended to produce a glass having a final fictive temperature of ~790° C. with high spatial uniformity. A comparison of FIG. 5 and FIG. 6, however, indicates less processing time and better spatial uniformity in Tf was obtained using the annealing treatment shown in FIG. 6. The isothermal hold step at 785° C. shown in trace 610 corresponds to an undercooling step that has the effect of accelerating ultimate convergence of the fictive temperature of regions of glass having different F concentration to the target fictive temperature of 790° C. The length of the annealing treatment shown in FIG. 6 is ~50 hours shorter than the length of the annealing treatment shown in FIG. 5 process.

Figure 7:
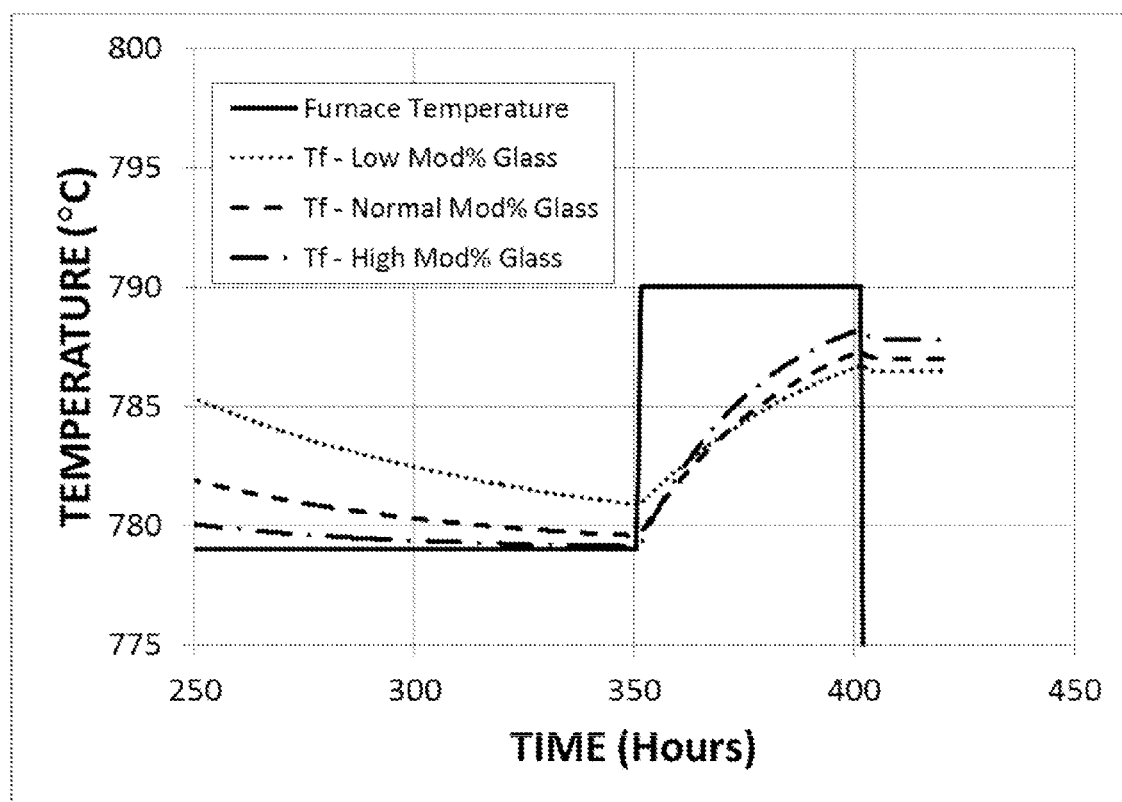
FIG. 7 shows the time variation of the fictive temperature of a modified titania-silica glass under annealing conditions that include cooling from 950° C. to 779° C. at a rate of 3° C./hr, holding at 779° C. for 265 hours, heating from 779° C. to 790° C., holding at 790° C. for 50 hours, and cooling to room temperature at the natural rate.

FIG. 7 exemplifies the calculated effect of a so-called "inversion anneal" on the fictive temperature of the F-modified titania-silica glass. As in FIG. 6, the annealing treatment includes a heating step after an isothermal hold. The temperature of the glass was ramped up to 950° C., held at 950° C. for ~10 hours, and then ramped down at a constant cooling rate of 3° C./hr to a hold temperature of 779° C. The glass was held at 779° C. for 265 hours and then heated to 790° C. The glass was held at 790° C. for 50 hours and then cooled naturally to room temperature. Traces 720, 730, and 740 show the fictive temperature (Tf) of regions of the glass having high (0.85 wt %), average (0.80 wt %), and low (0.75 wt %) F concentration, respectively. The fictive temperature in each region was observed to decrease with cooling. The peak-to-valley variability in Tf at the end of the hold at 779° C. was ~2° C., with the region of glass with high F concentration having a lower Tf than the region of glass with low F concentration. Heating to 790° C. and holding at 790° C. for 100 hours resulted in an inversion in the relative fictive temperatures of the regions with low and high F concentrations. The higher fictive temperature for the region of glass having high F concentration after holding at the higher temperature is due to its faster response to the increase in temperature. The data in FIG. 7 indicate that the fictive temperatures of the regions of glass with different F concentration are similar after a hold time of 10-15 hours at 790° C. At longer hold times, the fictive temperature of the region of glass having high F concentration becomes greater than the fictive temperature of the region of glass having low F concentration. If the hold were to be prolonged further, all glass regions would converge towards the furnace temperature, and the "inversion" effect would be progressively erased. Design of successful "inversion" annealing schedules requires intimate knowledge of the relaxation parameters of each specific glass composition, and need to be specifically tuned in each case. Those versed in the art will readily appreciate that small variations in glass compositions would thus require changes in the specific temperatures and times of the holding steps. These changes would not constitute a departure from the methods taught by the present invention.

Inversion anneals of the type shown in FIG. 7 provide a strategy for counteracting non-uniformities in the intrinsic contribution of modifiers to glass properties that result from non-uniformities in modifier concentration. If the intrinsic contribution of a glass modifier, for example, contributes to a reduction in fictive temperature, regions of high modifier concentration will have lower fictive temperatures than regions of low modifier concentration after a standard anneal. Subjecting the glass to a subsequent inversion anneal can equalize or reduce the variation in fictive temperature caused by intrinsic contributions through control of the extrinsic contribution of the modifier to fictive temperature. An inversion anneal can be designed to increase the extrinsic contribution of regions of high modifier concentration to fictive temperature to a greater degree than regions of low modifier concentration and the resulting differential in extrinsic contribution offsets the differential in intrinsic contribution caused by the non-uniformity in concentration.

The ability of inversion annealing treatments to control extrinsic contributions of glass properties in a way that counteracts variations in intrinsic contributions resulting from non-uniformities in modifier concentration applies to modifiers generally, but may be particularly advantageous when the modifier is a mixed modifier. As noted hereinabove, mixed modifiers are modifiers whose effect on glass properties includes comparable contributions from intrinsic and extrinsic effects. Concentration non-uniformities in mixed modifiers lead to non-uniformities in the intrinsic contributions to glass properties. An inversion annealing treatment can influence the extrinsic contributions of regions differing in modifier concentration to differing degrees to offset differences in intrinsic contributions resulting from non-uniformities in modifier concentration.

Glasses subjected to inversion annealing treatments may include regions of high modifier concentration and regions of low modifier concentration, where the fictive temperature of the regions of high modifier concentration is higher than the fictive temperature of the regions of low modifier concentration. In one embodiment, the glass is a modified titania-silica glass with an average modifier concentration of at least 0.1 wt % that includes a high concentration region having a modifier concentration at least 0.01 wt % greater than the average modifier concentration and low concentration region having a modifier concentration of at least 0.01 wt % less than the average modifier concentration, where the high concentration region has a higher fictive temperature than the low concentration region. The average modifier concentration may be at least 0.2 wt %, or at least 0.3 wt %, or at least 0.5 wt %, or at least 1.0 wt %, or at least 2.0 wt %, or at least 3.0 wt %. The fictive temperature of the high modifier concentration region may be greater than the fictive temperature of the low modifier concentration region by at least 1° C., or at least 2° C., or at least 3° C., or at least 5° C.

In one embodiment, the glass is a modified titania-silica glass with an average modifier concentration of at least 0.1 wt % that includes a high concentration region having a modifier concentration at least 0.02 wt % greater than the average modifier concentration and low concentration region having a modifier concentration of at least 0.02 wt % less than the average modifier concentration, where the high concentration region has a higher fictive temperature than the low concentration region. The average modifier concentration may be at least 0.2 wt %, or at least 0.3 wt %, or at least 0.5 wt %, or at least 1.0 wt %, or at least 2.0 wt %, or at least 3.0 wt %. The fictive temperature of the high modifier concentration region may be greater than the fictive temperature of the low modifier concentration region by at least 1° C., or at least 2° C., or at least 3° C., or at least 5° C.

In one embodiment, the glass is a modified titania-silica glass with an average modifier concentration of at least 0.1 wt % that includes a high concentration region having a modifier concentration at least 0.05 wt % greater than the average modifier concentration and low concentration region having a modifier concentration of at least 0.05 wt % less than the average modifier concentration, where the high concentration region has a higher fictive temperature than the low concentration region. The average modifier concentration may be at least 0.2 wt %, or at least 0.3 wt %, or at least 0.5 wt %, or at least 1.0 wt %, or at least 2.0 wt %, or at least 3.0 wt %. The fictive temperature of the high modifier concentration region may be greater than the fictive temperature of the low modifier concentration region by at least 1° C., or at least 2° C., or at least 3° C., or at least 5° C.

In one embodiment, the glass is a modified titania-silica glass with an average modifier concentration of at least 0.2 wt % that includes a high concentration region having a modifier concentration at least 0.1 wt % greater than the average modifier concentration and low concentration region having a modifier concentration of at least 0.1 wt % less than the average modifier concentration, where the high concentration region has a higher fictive temperature than the low concentration region. The average modifier concentration may be at least 0.3 wt %, or at least 0.5 wt %, or at least 1.0 wt %, or at least 2.0 wt %, or at least 3.0 wt %. The fictive temperature of the high modifier concentration region may be greater than the fictive temperature of the low modifier concentration region by at least 1° C., or at least 2° C., or at least 3° C., or at least 5° C.

Tables 1-4 below present modeled data that describes the effect of different annealing treatments on the peak-to-valley variation in fictive temperature ($\Delta Tf$) and peak-to-valley variation in the coefficient of thermal expansion ($\Delta CTE$) for unmodified and modified titania-silica glass. The data consider the effect of spatial non-uniformities in $TiO_2$ (for unmodified titania-silica glass) and modifiers (for modified titania-silica glasses) on peak-to-valley variations in fictive temperature and CTE. Although modified titania-silica glasses may also include spatial non-uniformities in $TiO_2$ content, for reasons discussed above and further demonstrated below, the effect of spatial non-uniformities in $TiO_2$ concentration on CTE originate primarily from intrinsic contributions. As a result, variations in CTE arising from spatial non-uniformities in $TiO_2$ concentration are not particularly sensitive to annealing conditions. For this reason, the results in Tables 1-4 for modified titania-silica glasses specify the effect of annealing conditions in peak-to-valley variations in CTE and Tf in relation to spatial non-uniformity in modifier concentration. In addition to $\Delta Tf$ and $\Delta CTE$, Tables 1-4 also list the intrinsic ($\Delta CTEi$) and extrinsic ($\Delta CTEe$) contributions to peak-to-valley variation in CTE (where $\Delta CTE = \Delta CTEi + \Delta CTEe$).

The values of $\Delta Tf$, $\Delta CTE$, $\Delta CTEi$, and $\Delta CTEe$ in Tables 1-4 correspond to the difference between the value in regions of the glass having maximum $TiO_2$ (unmodified titania-silica glass) or modifier (modified titania-silica glasses) concentration and regions of the glass having minimum $TiO_2$ (unmodified titania-silica glass) or modifier (modified titania-silica glasses) concentration, where the maximum and minimum concentrations correspond to the endpoints of the concentration range associated with the peak-to-valley variation of $TiO_2$ (unmodified titania-silica glass) or modifier (modified titania-silica glasses) concentration listed in Tables 1-4. The model used in Tables 1-4 is based on a linear dependence of Tf and CTE on modifier concentration.

Model parameters used to generate the data in Tables 1-4 include Ki, KTf, and Ke. Ki quantifies the intrinsic contribution to CTE and corresponds to the change in CTE (in units of ppb/K or ppb/° C.) due to the intrinsic contribution of the modifier for a 1 wt % change in modifier concentration. A positive value of Ki means that an increase in modifier concentration acts to increase the CTE of the glass relative to the corresponding unmodified glass ($\Delta CTEi>0$) and a negative value of Ki means that an increase in modifier concentration acts to decrease the CTE of the glass relative to the corresponding unmodified glass ($\Delta CTEi<0$). By way of example, for every 1 wt % increase in the concentration of a modifier having Ki=50, the intrinsic contribution of the modifier to the CTE of the glass increases by 50 ppb/K. KTf similarly quantifies the effect of a 1 wt % increase in modifier concentration on the fictive temperature (in units of K or ° C.) of the glass. KTf can be influenced by annealing conditions and can be positive or negative. By way of example, for every 1 wt % increase in the concentration of a modifier having KTf=50, the fictive temperature of the glass increases by 50 K. Ke is a measure of the extrinsic contribution of the modifier to CTE and is a multiplicative factor that combines with the change in fictive temperature to determine the extrinsic contribution to CTE: $\Delta CTEe=Ke*\Delta Tf$.

Tables 1-4 include modeled values of $\Delta CTE$, $\Delta CTEi$, $\Delta CTEe$, and $\Delta Tf$ for three different annealing treatments: a normal anneal, an isothermal anneal, and an inversion anneal. The normal anneal is shown in FIG. 1 and includes heating the glass to 950° C., holding the glass at 950° C. for 10 hours, cooling the glass to 950° C. at a rate of 3° C./hour, and finally cooling the glass at the natural rate to room temperature. The isothermal anneal is of the type shown in FIGS. 2-5. The cycle shown in FIG. 2 includes heating the glass to 950° C., holding the glass at 950° C. for 10 hours, cooling the glass to 820° C. at a rate of 3° C./hour, holding the glass at 820° C. for 50 hours, and cooling the glass at the natural rate to room temperature. The inversion anneal is of the type shown in FIG. 7; it includes heating the glass to 950° C., holding the glass at 950° C. for 10 hours, cooling the glass to 779° C. at a rate of 3° C./hour, holding the glass at 779° C. for 265 hours, heating the glass to 790° C. over a period of one hour, holding the glass at 790° C. for 50 hours, and cooling the glass at the natural rate to room temperature.

Table 1 presents modeled results for an unmodified commercial titania-silica glass, such as ULE® Glass, code 7972, available from Corning, Inc. The composition of the glass is ~7.4 wt % $TiO_2$ and ~92.6 wt % $SiO_2$, and includes ~0.1 wt % OH, which is a residual of the manufacturing process. As the OH content is substantially fixed for all ULE® glass produced and commercially sold, we do not evaluate OH variations in this discussion, and thus consider this glass "unmodified". Those versed in the art would readily recognize that a glass without any OH content would require adjustments to the annealing schedules in order to compensate for the modifying contribution of residual OH. The modeling parameters for the glass were Ki=-80 (ppb/° C.)/(wt % $TiO_2$), KTf=-5° C./(wt % $TiO_2$) (normal anneal), KTf=-0.5° C./(wt % $TiO_2$) (isothermal anneal) and Ke=-0.6 ppb/° C./° C. The column labeled "$\Delta TiO_2$" refers to the peak-to-valley variation in $TiO_2$ content in the glass in units of wt %. $\Delta TiO_2=0$ corresponds to a glass with a perfectly uniform concentration of $TiO_2$ throughout the glass. Non-zero values of $\Delta TiO_2$ correspond to glasses having a non-uniform concentration of $TiO_2$, where the value of $\Delta TiO_2$ corresponds to the peak-to-valley variation in $TiO_2$ concentration relative to a uniform concentration of 7.4 wt %. $\Delta TiO_2=0.1$, for example, refers to a glass having a $TiO_2$ concentration of 7.4±0.05 wt %. Such a glass has regions with $TiO_2$ concentration ranging from 7.35 wt % to 7.45 wt %.

The results shown in Table 1 indicate that the intrinsic contribution of $TiO_2$ to CTE is far greater than the extrinsic contribution of $TiO_2$ to CTE. As indicated hereinabove, annealing conditions have essentially no effect on intrinsic contributions to CTE and primarily influence extrinsic contributions to CTE. The data in Table 1 are consistent with the expected influence of annealing conditions on the intrinsic and extrinsic contributions to CTE. $\Delta CTEi$ is the same for the normal and isothermal anneals, but $\Delta CTEe$ is much lower for the isothermal anneal than for the normal anneal. Because of the dominance of the intrinsic contribution, however, little difference is seen for the peak-to-valley variation in CTE for the normal anneal and isothermal anneal.

TABLE 1

Unmodified Titania-Silica Glass (7.4 wt % $TiO_2$ and 92.6 wt % $SiO_2$)

| | Normal Anneal | | | | Isothermal Anneal | | | |
| --- | --- | --- | --- | --- | --- | --- | --- | --- |
| $\Delta TiO_2$ | $\Delta CTEi$ | $\Delta Tf$ | $\Delta CTEe$ | $\Delta CTE$ | $\Delta CTEi$ | $\Delta Tf$ | $\Delta CTEe$ | $\Delta CTE$ |
| 0 | 0 | 0 | 0 | 0 | 0 | 0 | 0 | 0 |
| 0.1 | −8 | −0.5 | 0.3 | −7.7 | −8 | −0.05 | 0.03 | −8.0 |
| 0.2 | −16 | −1.0 | 0.6 | −15.4 | −16 | −0.10 | 0.06 | −15.9 |
| 0.3 | −24 | −1.5 | 0.9 | −23.1 | −24 | −0.15 | 0.09 | −23.9 |
| 0.4 | −32 | −2.0 | 1.2 | −30.8 | −32 | −0.20 | 0.12 | −31.9 |
| 0.5 | −40 | −2.5 | 1.5 | −38.5 | −40 | −0.25 | 0.15 | −39.9 |
| 0.6 | −48 | −3.0 | 1.8 | −46.2 | −48 | −0.30 | 0.18 | −47.8 |
| 0.7 | −56 | −3.5 | 2.1 | −53.9 | −56 | −0.35 | 0.21 | −55.8 |
| 0.8 | −64 | −4.0 | 2.4 | −61.6 | −64 | −0.40 | 0.24 | −63.8 |
| 0.9 | −72 | −4.5 | 2.7 | −69.3 | −72 | −0.45 | 0.27 | −71.7 |
| 1.0 | −80 | −5.0 | 3.0 | −77.0 | −80 | −0.50 | 0.30 | −79.7 |

Table 2 presents modeled results for a titania-silica glass modified by a purely extrinsic modifier. The purely extrinsic modifier is a theoretical construct intended to illustrate the effects of annealing conditions on extrinsic contributions to CTE. The average composition of the glass was 8.1 wt % $TiO_2$, 91.1 wt % $SiO_2$, and 0.8 wt % modifier. The modeling parameters for the glass were Ki=0 (ppb/° C.)/(wt % modifier), KTf=-125° C./(wt % modifier) (normal anneal), KTf=-12.5° C./(wt % modifier) (isothermal anneal) and Ke=-0.6 (ppb/° C.)/° C. The column labeled "$\Delta$Modifier" refers to the peak-to-valley variation in modifier content in the glass in units of wt %. ΔModifier=0 corresponds to a glass with a perfectly uniform concentration of modifier throughout the glass. Non-zero values of ΔModifier correspond to glasses having a non-uniform concentration of modifier, where the value of ΔModifier corresponds to the peak-to-valley variation in modifier concentration relative to a uniform concentration of 0.8 wt %. ΔModifier=0.1, for example, refers to a glass having a modifier concentration of 0.8±0.05 wt %. Such a glass has regions with modifier concentration ranging from 0.75 wt % to 0.85 wt %.

The results shown in Table 2 demonstrate the large effect that annealing conditions have on ΔCTE when the titania-silica glass is modified by a pure extrinsic modifier. In this instance, peak-to-valley variations in CTE reflect differences in the effect of compositional non-uniformity on the structural relaxation of the glass. It follows that the ability of annealing conditions to influence KTf in the absence of intrinsic contributions has a strong influence on peak-to-valley variations in CTE. KTf for the isothermal annealing cycle in FIG. 2 is much smaller than KTf for the normal annealing cycle shown in FIG. 1. The results accordingly show a substantial decrease in ΔCTE for the isothermal anneal relative to the normal anneal. KTf for the isothermal anneal can be controlled through the hold time. Longer hold times lead to greater decreases in KTf for the isothermal anneal relative to KTf for the normal anneal.

ΔF correspond to glasses having a non-uniform concentration of F, where the value of ΔF corresponds to the peak-to-valley variation in F concentration relative to a uniform concentration of X wt %. ΔF=0.1, for example, refers to a glass having a modifier (F) concentration of X±0.05 wt %. Such a glass has regions with modifier (F) concentration ranging from 0.75 wt % to 0.85 wt %.

F is an example of a modifier that is dominated by extrinsic contributions to CTE, but which also has non-negligible intrinsic contributions to CTE. Since $K_i<0$ for F, $\Delta CTE_i<0$ and the intrinsic contribution associated with spatial non-uniformities in the concentration of F leads to a decrease in CTE. The negative values of $K_{Tf}$ and $K_e$, in contrast, mean that the extrinsic contribution associated with spatial non-uniformities in the concentration of F lead to an increase in CTE. As a result, the intrinsic and extrinsic contributions associated with non-uniformities in the concentration of the modifier F partially offset each other. Table 3 indicates that in the case of the normal anneal, extrinsic contributions to CTE associated with F overcompensate for the intrinsic contributions. For the isothermal anneal, however, the annealing conditions can be adjusted to control extrinsic contributions to offset the intrinsic contributions nearly exactly. It should be noted that an annealing cycle with a very long isothermal hold such as shown in FIG. 2 would produce too narrow a range of Tf in the final state, and thus not allow for compensation between the intrinsic and extrinsic effects needed to minimize ΔCTE in the glass. It should be readily apparent to those skilled in the art that changes in average composition in the glass will require optimization of the temperature and duration of the isothermal hold for each particular case. Changes in temperature and duration of the hold do not constitute departures from the spirit of the present invention.

TABLE 2

Titania-Silica Glass with Pure Extrinsic Modifier

| | Normal Anneal | | | | Isothermal Anneal | | | |
|---|---|---|---|---|---|---|---|---|
| ΔModifier | ΔCTEi | ΔTf | ΔCTEe | ΔCTE | ΔCTEi | ΔTf | ΔCTEe | ΔCTE |
| 0 | 0 | 0 | 0 | 0 | 0 | 0 | 0 | 0 |
| 0.1 | 0 | −12.5 | 7.5 | 7.5 | 0 | −1.25 | 0.75 | 0.75 |
| 0.2 | 0 | −25.0 | 15.0 | 15.0 | 0 | −2.5 | 1.5 | 1.5 |
| 0.3 | 0 | −37.5 | 22.5 | 22.5 | 0 | −3.75 | 2.25 | 2.25 |
| 0.4 | 0 | −50.0 | 30.0 | 30.0 | 0 | −5.0 | 3.0 | 3.0 |
| 0.5 | 0 | −62.5 | 37.5 | 37.5 | 0 | −6.25 | 3.75 | 3.75 |
| 0.6 | 0 | −75.0 | 45.0 | 45.0 | 0 | −7.5 | 4.5 | 4.5 |
| 0.7 | 0 | −87.5 | 52.5 | 52.5 | 0 | −8.75 | 5.25 | 5.25 |
| 0.8 | 0 | −100.0 | 60.0 | 60.0 | 0 | −10.0 | 6.0 | 6.0 |
| 0.9 | 0 | −112.5 | 67.5 | 67.5 | 0 | −11.25 | 6.75 | 6.75 |
| 1.0 | 0 | −125.0 | 75.0 | 75.0 | 0 | −12.5 | 7.5 | 7.5 |

Table 3 presents modeled results for a titania-silica glass modified by F (fluorine). The average composition of the glass was 8.1 wt % $TiO_2$, 91.1 wt % $SiO_2$, and 0.8 wt % F. The modeling parameters for the glass were $K_i$=−26 (ppb/ C)/(wt % F), $K_{Tf}$=−140° C./(wt % F) (normal anneal), $K_{Tf}$=−40° C./(wt % F) (isothermal anneal) and $K_e$=−0.6 (ppb/° C.)/° C. The column labeled "ΔF" refers to the peak-to-valley variation in F content in the glass in units of wt %. ΔF=0 corresponds to a glass with a perfectly uniform concentration of F throughout the glass. Non-zero values of

TABLE 3

F-modified Titania-Silica Glass

| | Normal Anneal | | | | Isothermal Anneal | | | |
|---|---|---|---|---|---|---|---|---|
| ΔF | ΔCTEi | ΔTf | ΔCTEe | ΔCTE | ΔCTEi | ΔTf | ΔCTEe | ΔCTE |
| 0 | 0 | 0 | 0 | 0 | 0 | 0 | 0 | 0 |
| 0.1 | −2.6 | −14 | 8.4 | 5.8 | −2.6 | −4 | 2.4 | −0.2 |
| 0.2 | −5.2 | −28 | 16.8 | 11.6 | −5.2 | −8 | 4.8 | −0.4 |
| 0.3 | −7.8 | −42 | 25.2 | 17.4 | −7.8 | −12 | 7.2 | −0.6 |
| 0.4 | −10.4 | −56 | 33.6 | 23.2 | −10.4 | −16 | 9.6 | −0.8 |
| 0.5 | −13.0 | −70 | 42 | 29 | −13.0 | −20 | 12 | −1.0 |

TABLE 3-continued

F-modified Titania-Silica Glass

| | Normal Anneal | | | | Isothermal Anneal | | | |
|---|---|---|---|---|---|---|---|---|
| ΔF | ΔCTEi | ΔTf | ΔCTEe | ΔCTE | ΔCTEi | ΔTf | ΔCTEe | ΔCTE |
| 0.6 | −15.6 | −84 | 50.4 | 34.8 | −15.6 | −24 | 14.4 | −1.2 |
| 0.7 | −18.2 | −98 | 58.8 | 40.6 | −18.2 | −28 | 16.8 | −1.4 |
| 0.8 | −20.4 | −112 | 67.2 | 46.4 | −20.4 | −32 | 19.2 | −1.6 |
| 0.9 | −23.4 | −126 | 75.6 | 52.2 | −23.4 | −36 | 21.6 | −1.8 |
| 1.0 | −26.0 | −140 | 84 | 58 | −26.0 | −40 | 24 | −2.0 |

Tables 4 and 5 present modeled results for a titania-silica glass modified by a balanced modifier for which neither the extrinsic nor the intrinsic mechanism dominates the CTE non-uniformities. The composition of the glass was 10.7 wt % $TiO_2$, 87.3 wt % $SiO_2$, and 2.0 wt % modifier The modeling parameters for the glass were Ki=39 (ppb/° C.)/(wt % mod), KTf=−53° C./(wt % mod) (normal anneal), KTf=−5.33° C./(wt % mod) (isothermal anneal), KTf=+25° C./(wt % mod) (inversion anneal), and Ke=−0.6 (ppb/° C.)/° C. The column labeled "Δ mod" refers to the peak-to-valley variation in modifier content in the glass in units of wt %. Δ mod=0 corresponds to a glass with a perfectly uniform concentration of modifier throughout the glass. Non-zero values of Δ mod correspond to glasses having a non-uniform concentration of modifier, where the value of Δ mod corresponds to the peak-to-valley variation in modifier concentration relative to a uniform concentration of 2.0 wt %. Δ mod=0.1, for example, refers to a glass having a modifier concentration of 2.0±0.05 wt %. Such a glass has regions with modifier concentration ranging from 1.95 wt % to 2.05 wt %.

TABLE 4

Balanced Modifier in Titania-Silica Glass

| | Normal Anneal | | | | Isothermal Anneal | | | |
|---|---|---|---|---|---|---|---|---|
| Δmod | ΔCTEi | ΔTf | ΔCTEe | ΔCTE | ΔCTEi | ΔTf | ΔCTEe | ΔCTE |
| 0 | 0 | 0 | 0 | 0 | 0 | 0 | 0 | 0 |
| 0.1 | 3.9 | −5.3 | 3.2 | 7.1 | 3.9 | −0.53 | 0.32 | 4.2 |
| 0.2 | 7.8 | −10.6 | 6.4 | 14.2 | 7.8 | −1.07 | 0.64 | 8.4 |
| 0.3 | 11.7 | −15.9 | 9.5 | 21.2 | 11.7 | −1.60 | 0.96 | 12.7 |
| 0.4 | 15.6 | −21.2 | 12.7 | 28.3 | 15.6 | −2.10 | 1.28 | 16.9 |
| 0.5 | 19.5 | −26.5 | 15.9 | 35.4 | 19.5 | −2.67 | 1.60 | 21.1 |
| 0.6 | 23.4 | −31.8 | 19.1 | 42.5 | 23.4 | −3.20 | 1.92 | 25.3 |
| 0.7 | 27.3 | −37.1 | 22.3 | 49.6 | 27.3 | −3.73 | 2.24 | 29.5 |
| 0.8 | 31.2 | −42.4 | 25.4 | 56.7 | 31.2 | −4.26 | 2.56 | 33.8 |
| 0.9 | 35.1 | −47.7 | 28.6 | 63.7 | 35.1 | −4.80 | 2.88 | 38.0 |
| 1.0 | 39.0 | −53.0 | 31.8 | 70.8 | 39.0 | −5.33 | 3.20 | 42.2 |

TABLE 5

Balanced Modifier in Titania-Silica Glass

| | Inversion Anneal | | | |
|---|---|---|---|---|
| Δmod | ΔCTEi | ΔTf | ΔCTEe | ΔCTE |
| 0 | 0 | 0 | 0 | 0 |
| 0.1 | 3.9 | 2.5 | −1.5 | 2.4 |
| 0.2 | 7.8 | 5.0 | −3.0 | 4.8 |
| 0.3 | 11.7 | 7.5 | −4.5 | 7.2 |
| 0.4 | 15.6 | 10.0 | −6.0 | 9.6 |
| 0.5 | 19.5 | 12.5 | −7.5 | 12.0 |
| 0.6 | 23.4 | 15.0 | −9.0 | 14.4 |
| 0.7 | 27.3 | 17.5 | −10.5 | 16.8 |

TABLE 5-continued

Balanced Modifier in Titania-Silica Glass

| | Inversion Anneal | | | |
|---|---|---|---|---|
| Δmod | ΔCTEi | ΔTf | ΔCTEe | ΔCTE |
| 0.8 | 31.2 | 20.0 | −12.0 | 19.2 |
| 0.9 | 35.1 | 22.5 | −13.5 | 21.6 |
| 1.0 | 39.0 | 25.0 | −15.0 | 24.0 |

Since for this balanced modifier Ki>0, then ΔCTEi>0 and the intrinsic contribution associated with spatial non-uniformities in the modifier concentration leads to an increase in CTE. In the normal anneal and the isothermal anneal, KTf<0 and Ke<0, which means that the extrinsic contribution associated with spatial non-uniformities in the modifier concentration in these anneals also lead to an increase in CTE. As a result, the intrinsic and extrinsic contributions associated with non-uniformities in the concentration of the modifier are additive and cannot be used to offset each in the normal anneal and the isothermal. Table 4 indicates, however, that the isothermal anneal is preferable to the normal anneal because it minimizes the extrinsic contribution to ΔCTE. ΔCTEe decreases and ΔCTE approaches the value of ΔCTEi.

Table 5 illustrates the benefit of an inversion anneal for glasses with modifiers in which anneals lacking a heating step cannot be adjusted to permit extrinsic contributions to CTE to offset intrinsic contributions to CTE. The heating step in the inversion anneal leads to a reversal in the sign of KTf so that extrinsic contributions to CTE counteract intrinsic contributions in CTE. The data in Table 5 indicate that for the particular inversion anneal considered, ΔCTE<ΔCTEi. Further refinement of the conditions of the inversion anneal would permit adjustment of the extrinsic contributions to CTE to more exactly offset the intrinsic contributions to CTE.

Tables 6 and 7 present modeled results for a titania-silica glass modified by $B_2O_3$. The composition of the glass was 10.7 wt % $TiO_2$, 86.9 wt % $SiO_2$, and 2.4 wt % $B_2O_3$. The modeling parameters for the glass were Ki=81 (ppb/° C.)/(wt % $B_2O_3$), KTf=−62° C./(wt % $B_2O_3$) (normal anneal), KTf=−6.2° C./(wt % $B_2O_3$) (isothermal anneal), KTf=30° C./(wt % $B_2O_3$) (inversion anneal), and Ke=−0.6 (ppb/° C.)/° C. The column labeled "$\Delta B_2O_3$" refers to the peak-to-valley variation in $B_2O_3$ content in the glass in units of wt %. $\Delta B_2O_3$=0 corresponds to a glass with a perfectly uniform concentration of $B_2O_3$ throughout the glass. Non-zero values of $\Delta B_2O_3$ correspond to glasses having a non-uniform concentration of $B_2O_3$, where the value of $\Delta B_2O_3$ corresponds to the peak-to-valley variation in $B_2O_3$ concentration relative to a uniform concentration of 2.4 wt %. $\Delta B_2O_3$=0.1, for example, refers to a glass having a modifier ($B_2O_3$) concentration of 2.4±0.05 wt %. Such a glass has regions with modifier ($B_2O_3$) concentration ranging from 2.35 wt % to 2.45 wt %.

the concentration of the modifier $B_2O_3$ are additive and cannot be used to offset each in the normal anneal and the isothermal. Table 6 indicates, however, that the isothermal anneal is preferable to the normal anneal because it minimizes the extrinsic contribution to $\Delta$CTE. $\Delta$CTEe decreases and $\Delta$CTE approaches the value of $\Delta$CTEi.

Table 7 illustrates the benefit of an inversion anneal for glasses modified with $B_2O_3$. As in the case on the balanced modifier described in Tables 4 and 5, the heating step in the inversion anneal leads to a reversal in the sign of KTf so that extrinsic contributions to CTE counteract intrinsic contributions in CTE. The data in Table 7 indicate that for the particular inversion anneal considered, $\Delta$CTE<$\Delta$CTEi. In the case of $B_2O_3$ the improvement afforded by the inversion anneal is not as significant as for other modifiers, mainly due to the relatively high magnitude of the intrinsic coefficient Ki. Despite this intrinsic disadvantage of the glass modified with $B_2O_3$, Table 7 shows a clear benefit of the inversion cycle compared to both the normal and isothermal cycles. Further refinement of the conditions of the inversion anneal would permit adjustment of the extrinsic contributions to CTE to maximize the offset to the intrinsic contributions to CTE.

TABLE 6

$B_2O_3$-modified Titania-Silica Glass

| | Normal Anneal | | | | Isothermal Anneal | | | |
|---|---|---|---|---|---|---|---|---|
| $\Delta B_2O_3$ | $\Delta$CTEi | $\Delta$Tf | $\Delta$CTEe | $\Delta$CTE | $\Delta$CTEi | $\Delta$Tf | $\Delta$CTEe | $\Delta$CTE |
| 0 | 0 | 0 | 0 | 0 | 0 | 0 | 0 | 0 |
| 0.1 | 8.1 | −6.2 | 3.7 | 11.8 | 8.1 | −0.6 | 0.4 | 8.5 |
| 0.2 | 16.2 | −12.4 | 7.4 | 23.6 | 16.2 | −1.2 | 0.7 | 16.9 |
| 0.3 | 24.3 | −18.6 | 11.2 | 35.5 | 24.3 | −1.9 | 1.1 | 25.4 |
| 0.4 | 32.4 | −24.8 | 14.9 | 47.3 | 32.4 | −2.5 | 1.5 | 33.9 |
| 0.5 | 40.5 | −31 | 18.6 | 59.1 | 40.5 | −3.1 | 1.9 | 42.4 |
| 0.6 | 48.6 | −37.2 | 22.3 | 70.9 | 48.6 | −3.7 | 2.2 | 50.8 |
| 0.7 | 56.7 | −43.4 | 26 | 82.7 | 56.7 | −4.3 | 2.6 | 59.3 |
| 0.8 | 64.8 | −49.6 | 29.8 | 94.6 | 64.8 | −5.0 | 3.0 | 67.8 |
| 0.9 | 72.9 | −55.8 | 33.5 | 106.4 | 72.9 | −5.6 | 3.3 | 76.2 |
| 1.0 | 81 | −62 | 37.2 | 118.2 | 81 | −6.2 | 3.7 | 84.7 |

TABLE 7

$B_2O_3$-modified Titania-Silica Glass

| | Inversion Anneal | | | |
|---|---|---|---|---|
| $\Delta B_2O_3$ | $\Delta$CTEi | $\Delta$Tf | $\Delta$CTEe | $\Delta$CTE |
| 0 | 0 | 0 | 0 | 0 |
| 0.1 | 8.1 | 3 | −1.8 | 6.3 |
| 0.2 | 16.2 | 6 | −3.6 | 12.6 |
| 0.3 | 24.3 | 9 | −5.4 | 18.9 |
| 0.4 | 32.4 | 12 | −72 | 25.2 |
| 0.5 | 40.5 | 15 | −9 | 31.5 |
| 0.6 | 48.6 | 18 | −10.8 | 37.8 |
| 0.7 | 56.7 | 21 | −12.6 | 44.1 |
| 0.8 | 64.8 | 24 | −14.4 | 50.4 |
| 0.9 | 72.9 | 27 | −16.2 | 56.7 |
| 1.0 | 81 | 30 | −18 | 63 |

$B_2O_3$ is an example of a modifier that exhibits comparable intrinsic and extrinsic contributions to CTE. Since Ki>0 for $B_2O_3$, then $\Delta$CTEi>0 and the intrinsic contribution associated with spatial non-uniformities in the concentration of $B_2O_3$ leads to an increase in CTE. In the normal anneal and the isothermal anneal, KTf<0 and Ke<0, which means that the extrinsic contribution associated with spatial non-uniformities in the concentration of $B_2O_3$ in these anneals also lead to an increase in CTE. As a result, the intrinsic and extrinsic contributions associated with non-uniformities in Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. An article comprising a glass, said glass having a composition comprising:
   7.0 wt %-13.0 wt % $TiO_2$;
   79.0 wt %-92.9 wt % $SiO_2$; and
   0.1 wt %-8.0 wt % modifier;
   wherein said glass has an average CTE slope at 20° C. of less than 1.2 ppb/$K^2$; and wherein said glass has a non-uniform coefficient of thermal expansion at 20° C., said non-uniform coefficient of thermal expansion including a maximum coefficient of thermal expansion and a minimum coefficient of thermal expansion, the difference between said maximum coefficient of thermal expansion and said minimum coefficient of thermal expansion being greater than 0.06 ppb/K and not exceeding 5 ppb/K; and wherein said glass has a non-uniform modifier concentration, said non-uniform modifier concentration including a maximum modifier concentration and a minimum modifier concentration, the difference between said maximum modifier concentration and said minimum modifier concentration exceeding 0.03 wt %.

2. The article of claim 1, wherein said modifier is F or $B_2O_3$.

3. The article of claim 1, wherein said modifier is $B_2O_3$ and said glass comprises 2.0 wt %-6.0 wt % of said modifier.

4. The article of claim 1, wherein said difference between said maximum coefficient of thermal expansion and said minimum coefficient of thermal expansion does not exceed 2 ppb/K.

5. The article of claim 4, wherein said difference between said maximum modifier concentration and said minimum modifier concentration exceeds 0.05 wt %.

6. The article of claim 5, wherein said difference between said maximum coefficient of thermal expansion and said minimum coefficient of thermal expansion does not exceed 1 ppb/K.

7. The article of claim 6, wherein said glass comprises 0.5 wt %-7.5 wt % of said modifier and said difference between said maximum modifier concentration and said minimum modifier concentration exceeds 0.10 wt %.

8. The article of claim 1, wherein said difference between said maximum coefficient of thermal expansion and said minimum coefficient of thermal expansion does not exceed 3 ppb/K and said difference between said maximum modifier concentration and said minimum modifier concentration exceeds 0.05 wt %.

9. An article comprising a glass, said glass having a composition comprising:

7.0 wt %-13.0 wt % $TiO_2$;

at least 79.0 wt % $SiO_2$; and a modifier, said modifier having an average concentration of at least 0.1 wt %, said glass having an average CTE slope at 20° C. less than 1.2 ppb/K$^2$; said glass including a first region and a second region, said first region having a first fictive temperature and a concentration of said modifier at least 0.03 wt % greater than said average modifier concentration, said second region having a second fictive temperature and a concentration of said modifier at least 0.03 wt % less than said average modifier concentration, said first fictive temperature exceeding said second fictive temperature.

10. The article of claim 9, wherein said average concentration of said modifier is at least 0.5 wt %.

11. The article of claim 9, wherein said first region has a concentration of said modifier at least 0.05 wt % greater than said average modifier concentration and said second region has a concentration of said modifier at least 0.05 wt % less than said average modifier concentration.

12. The article of claim 9, wherein said average modifier concentration is at least 0.2 wt % and said first region has a concentration of said modifier at least 0.10 wt % greater than said average modifier concentration and said second region has a concentration of said modifier at least 0.10 wt % less than said average modifier concentration.

13. The article of claim 9, wherein said first fictive temperature exceeds said second fictive temperature by at least 1° C.

14. The article of claim 9, wherein said glass comprises 8.0 wt %-12.0 wt % $TiO_2$ and 80.0 wt %-91.9 wt % $SiO_2$.

15. The article of claim 9, wherein said average modifier concentration is at least 1.0 wt %.

16. The article of claim 9, wherein said first fictive temperature exceeds said second fictive temperature by at least 1° C.

17. The article of claim 9, wherein said first fictive temperature exceeds said second fictive temperature by at least 3° C.

* * * * *